United States Patent
Lee et al.

(10) Patent No.: US 11,395,249 B2
(45) Date of Patent: Jul. 19, 2022

(54) METHOD FOR TRANSMITTING SYNCHRONIZATION SIGNAL IN WIRELESS COMMUNICATION SYSTEM AND TERMINAL USING SAME METHOD

(71) Applicant: LG Electronics Inc., Seoul (KR)

(72) Inventors: Jongyoul Lee, Seoul (KR); Hanbyul Seo, Seoul (KR); Seungmin Lee, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 139 days.

(21) Appl. No.: 16/976,689

(22) PCT Filed: Feb. 25, 2019

(86) PCT No.: PCT/KR2019/002271
§ 371 (c)(1),
(2) Date: Aug. 28, 2020

(87) PCT Pub. No.: WO2019/168311
PCT Pub. Date: Sep. 6, 2019

(65) Prior Publication Data
US 2021/0007073 A1    Jan. 7, 2021

Related U.S. Application Data

(60) Provisional application No. 62/637,989, filed on Mar. 2, 2018, provisional application No. 62/636,715, filed on Feb. 28, 2018.

(51) Int. Cl.
*H04W 56/00* (2009.01)
*H04W 76/14* (2018.01)
(Continued)

(52) U.S. Cl.
CPC ......... *H04W 56/0015* (2013.01); *H04W 4/40* (2018.02); *H04W 52/146* (2013.01);
(Continued)

(58) Field of Classification Search
CPC ... H04W 4/40; H04W 52/146; H04W 52/243; H04W 52/244; H04W 52/281;
(Continued)

(56) References Cited

U.S. PATENT DOCUMENTS

| 10,383,023 B1* | 8/2019 | Hahn ............... H04W 36/22 |
| 10,939,463 B2* | 3/2021 | Wu ................. H04L 5/001 |
| 11,057,854 B2* | 7/2021 | Nguyen ........... H04W 56/0015 |

FOREIGN PATENT DOCUMENTS

| WO | WO-2015152629 A1 * | 10/2015 | ........ H04W 52/0209 |
| WO | WO-2016047994 A1 * | 3/2016 | .......... H04W 52/248 |
| WO | WO2016200213 | 12/2016 | |

OTHER PUBLICATIONS

EP Extended European Search Report in European Appln. No. 19760116.4, dated Feb. 16, 2021, 11 pages.
(Continued)

*Primary Examiner* — Thomas R Cairns
(74) *Attorney, Agent, or Firm* — Fish & Richardson P.C.

(57) ABSTRACT

The present document relates to a method for performing a vehicle-to-X (V2X) transmission performed by a terminal supporting carrier aggregation (CA) of a plurality of carriers in a wireless communication system, wherein the method determines a first carrier to be used as a synchronization reference among the plurality of carriers and performs the V2X transmission on the basis of the determination, wherein at least one carrier of the carriers not used as the synchronization reference is a second carrier, and the terminal reduces the transmission power on the second carrier, maintains the transmission of a packet on the second carrier, or drops a packet on the second carrier.

10 Claims, 22 Drawing Sheets

(51) Int. Cl.
  *H04W 4/40* (2018.01)
  *H04W 52/14* (2009.01)
  *H04W 72/08* (2009.01)
  *H04W 92/18* (2009.01)
(52) U.S. Cl.
  CPC ........... *H04W 72/08* (2013.01); *H04W 76/14* (2018.02); *H04W 92/18* (2013.01)
(58) Field of Classification Search
  CPC ............. H04W 52/343; H04W 52/383; H04W 56/001; H04W 56/0015; H04W 72/08; H04W 76/14; H04W 92/18
  See application file for complete search history.

(56) References Cited

OTHER PUBLICATIONS

Intel Corporation, "Discussion on synchronous and asynchronous scenarios in V2X CA," R4-1712346, 3GPP TSG-RAN WG4 Meeting #85, Reno, Nevada, USA, dated Nov. 27-Dec. 1, 2017, 3 pages.

LG Electronics, "Offline summary for mode 4 CA," R1-1721223, 3GPP TSG RAN WG1 Meeting #91, Rene, USA, Nov. 27-Dec. 1, 2017, 2 pages.

Nokia, Nokia Shanghai Bell, "Tx power allocation in SL CA," R1-1802581, 3GPP TSG-RAN WG1 Meeting #92, Athens, Greece, dated Feb. 26-Mar. 2, 2018, 2 pages.

Samsung, "Power allocation for simultaneous UL and SL TX in different carriers," R1-1612393, 3GPP TSG RAN WG1 Meeting #87, Reno, USA, dated Nov. 14-18, 2016, 3 pages.

Catt, "Discussion on synchronization for carrier aggregation in V2X Phase 2," R1-1801702, 3GPP TSG RAN WG1 Meeting #92, Athens, Greece, Feb. 26-Mar. 2, 2018, 4 pages.

Itri, "Discussion on Synchronization Aspects for Carrier Aggregation in V2X Phase 2," R1-1802078, 3GPP TSG RAN WG1 Meeting 92, Athens, Greece, Feb. 26-Mar. 2, 2018, 4 pages.

Oppo, "Synchronization in eV2X carrier aggregation," R1-1802111, 3GPP TSG RAN WG1 Meeting #92, Athens, Greece, Feb. 26-Mar. 2, 2018, 2 pages.

Samsung, "Synchronization in V2X CA," R1-1801919, 3GPP TSG RAN WG1 #92, Athens, Greece, Feb. 26-Mar. 2, 2018, 3 pages.

* cited by examiner

METHOD FOR TRANSMITTING SYNCHRONIZATION SIGNAL IN WIRELESS COMMUNICATION SYSTEM AND TERMINAL USING SAME METHOD

CROSS-REFERENCE TO RELATED APPLICATIONS

This application is a National Stage application under 35 U.S.C. § 371 of International Application No. PCT/KR2019/002271, filed on Feb. 25, 2019, which claims the benefit of U.S. Provisional Application No. 62/636,715, filed on Feb. 28, 2018 and U.S. Provisional Application No. 62/637,989, filed on Mar. 2, 2018. The disclosures of the prior applications are incorporated by reference in their entirety.

FIELD OF THE DISCLOSURE

The present disclosure relates to a wireless communication system and, more particularly, to a method for transmitting a synchronization signal in a wireless communication system and a User Equipment using the same.

RELATED ART

Recently, in 3GPP standardization organization, it has been considered a network slicing technique for implementing a plurality of logical networks on a single physical network in the NR system, which is 5G wireless communication system. To this end, the logical networks needs to be capable of supporting services having various requirements (e.g., enhanced Mobile Broadband (eMBB), massive Machine Type Communication (mMTC), Ultra Reliable Low Latency Communication (URLLC), etc.). In addition, in the physical layer system of the NR system, it has been considered a technique for supporting an orthogonal frequency division multiplexing (OFDM) scheme in which a variable numerology is applicable according to the various services. In other words, in the NR (New RAT) system, an OFDM scheme (or a multiple access scheme) in which independent numerologies are applied in each time and frequency resource region may be supported.

Hereinafter, the present disclosure proposes a method for solving the problem that a transmission using only a synchronization reference exerts as an interference signal to other User Equipments in a specific component carrier, when a transmission User Equipment selects and transmits a plurality of component carriers for (e)V2X communication.

SUMMARY OF THE DISCLOSURE

The present disclosure provides a method for transmitting a synchronization signal in a wireless communication system and a User Equipment using the same.

In an aspect, a method for performing a vehicle-to-X (V2X) transmission in a wireless communication system is provided. The method performed by a user equipment (UE), which supports a carrier aggregations (CA) of a plurality of carriers, and comprising: determining a first carrier used for a synchronization reference among the plurality of carriers and performing the V2X transmission based on a determination, wherein at least one carrier, which is not used as the synchronization reference, is a second carrier, and wherein the UE reduces a transmission power on the second carrier, or maintains a transmission of a packet on the second carrier, or drops the packet on the second carrier.

A channel busy ratio (CBR) may be used as a criteria for reducing the transmission power or dropping the packet on the second carrier among the plurality of carriers.

A ProSe per packet priority (PPPP) may be used as a criteria for reducing the transmission power or dropping the packet on the second carrier among the plurality of carriers.

A carrier other than the second carrier among carriers not used as the synchronization reference may be a third carrier, the UE may transmit a Side Link Synchronization Signal (SLSS) on the third carrier.

The UE may also transmit SLSS on the second carrier.

A channel busy ratio (CBR) or a ProSe per packet priority (PPPP) may be used as a criteria for reducing a transmission power or dropping a packet on the third carrier among the plurality of carriers.

The UE may reduce the transmission power or drops the packet on the second carrier based on a transmission power of a Side Link Synchronization Signal (SLSS) transmitted by another UE.

The UE may reduce the transmission power or drops the packet on the second carrier based on a field value of a priority in a Side Link Synchronization Signal (SLSS) transmitted by another UE.

If the field value of the priority is higher than a specific threshold, the UE may transmit a data together with the SLSS or only the data, and if the field value of the priority is lower than the specific threshold, the UE may reduce the transmission power on the second carrier or drops the packet.

In another aspect, a user equipment (UE) supporting a carrier aggregations (CA) of a plurality of carriers is provided. The UE may comprise: a transceiver for transmitting and receiving a wireless signal and a processor that operates in conjunction with the transceiver, wherein the processor is configured to: determine a first carrier used for a synchronization reference among the plurality of carriers and perform a vehicle-to-X (V2X) transmission based on a determination, wherein at least one carrier, which is not used as the synchronization reference, is a second carrier, and wherein the UE reduces a transmission power on the second carrier, or maintains a transmission of a packet on the second carrier, or drops the packet on the second carrier.

According to the present disclosure, it may be solved the problem; since synchronization (time/frequency) of a packet transmitted in a specific component carrier used as a reference is different from those of neighboring other User Equipments (UEs), the packet transmitted in a specific component carrier used as a reference exerts as an interference signal to the neighboring other UEs or other UEs without CA capability.

DESCRIPTION OF EXEMPLARY EMBODIMENTS

In what follows, for those terms or acronyms not defined separately, the 3GPP TS 36 series or TS 38 series may be referred to.

Figure 1:
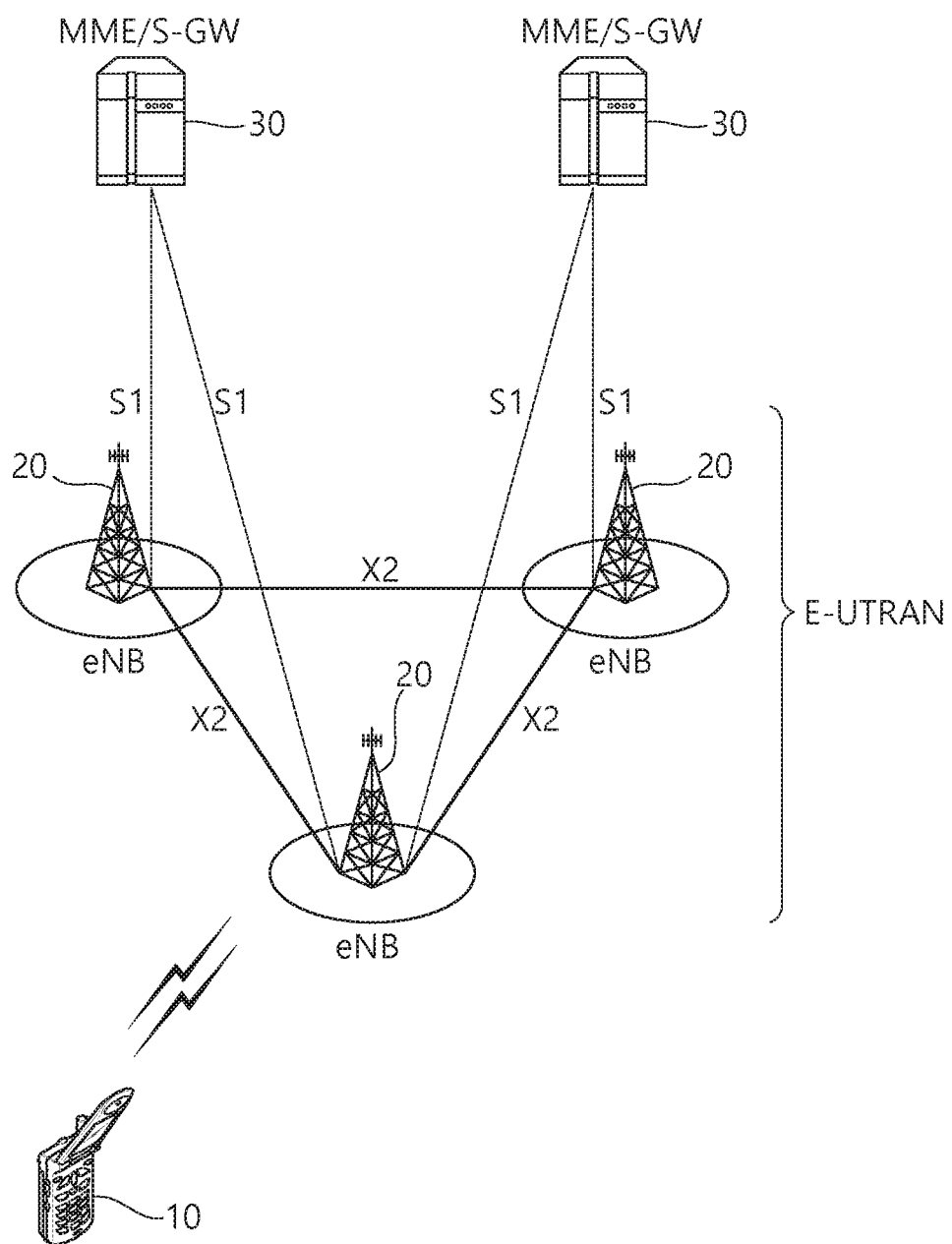
FIG. 1 illustrates a wireless communication system.

FIG. 1 illustrates a wireless communication system. The wireless communication system may also be referred to as an evolved-UMTS terrestrial radio access network (E-UTRAN), or long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
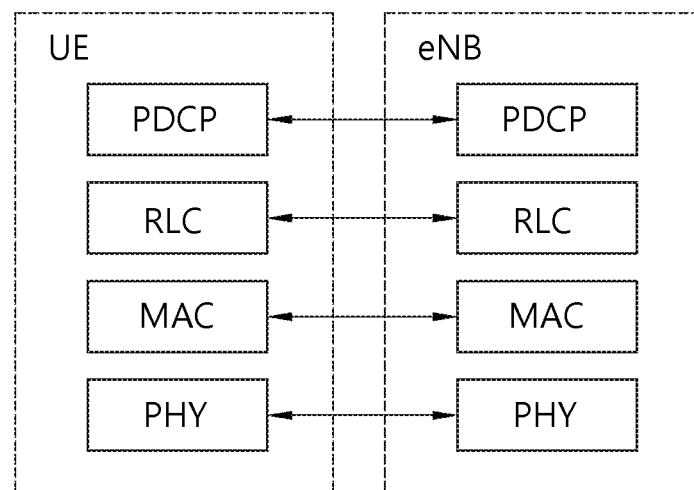
FIG. 2 is a diagram showing a wireless protocol architecture for a user plane.
Figure 3:
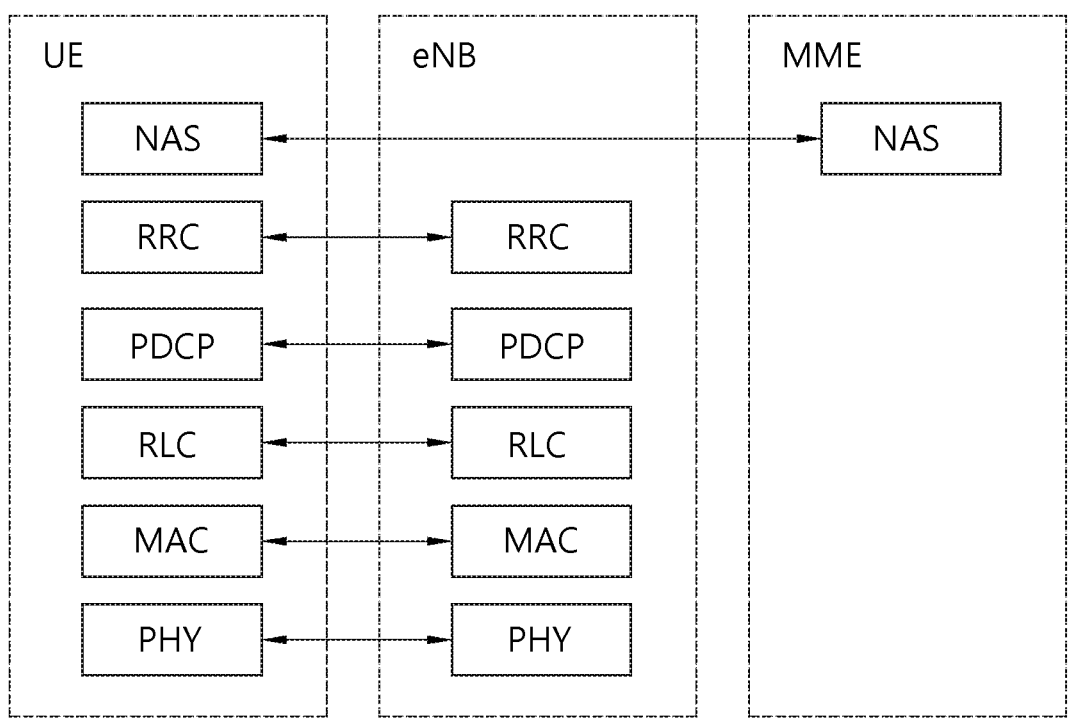
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT) will be described. The new RAT may be abbreviated as new radio (NR).

As more communication devices demand larger communication capacities, there is a need for improved mobile broadband communication as compared to the existing radio access technologies (RAT). Massive machine type Communications (MTC), which connects multiple devices and objects to provide various services anytime and anywhere, is also one of the major issues to consider in next-generation communication. In addition, communication system design considering services/terminals that are sensitive to reliability and latency has been discussed. The introduction of next-generation wireless access technologies considering such enhanced mobile broadband communication, massive MTC, ultra-reliable and low latency communication (URLLC), and the like, has been discussed, and the corresponding technology is referred to as new RAT or NR for the convenience sake in the present disclosure.

Figure 4:
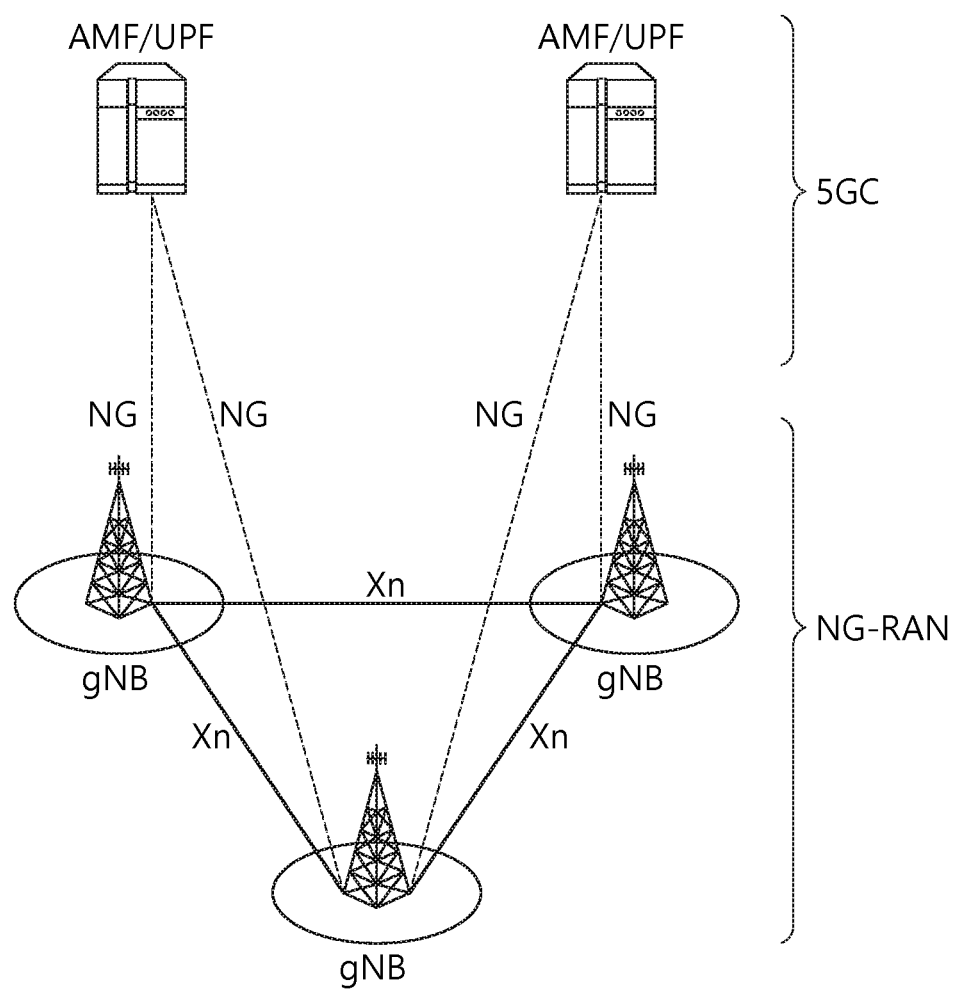
FIG. 4 illustrates a system structure of a new generation radio access network (NG-RAN) to which NR is applied.

FIG. 4 illustrates a system structure of a new generation radio access network (NG-RAN) to which NR is applied.

Referring to FIG. 4, the NG-RAN may include a gNB and/or an eNB providing a user plane and a control plane protocol termination to a terminal. FIG. 4 illustrates a case of including only the gNB. The gNB and eNB are connected to each other by an Xn interface. The gNB and eNB are connected to a 5G Core Network (5GC) through an NG interface. More specifically, the gNB and eNB are connected to the access and mobility management function (AMF) through an NG-C interface and connected to a user plane function (UPF) through an NG-U interface.

Figure 5:
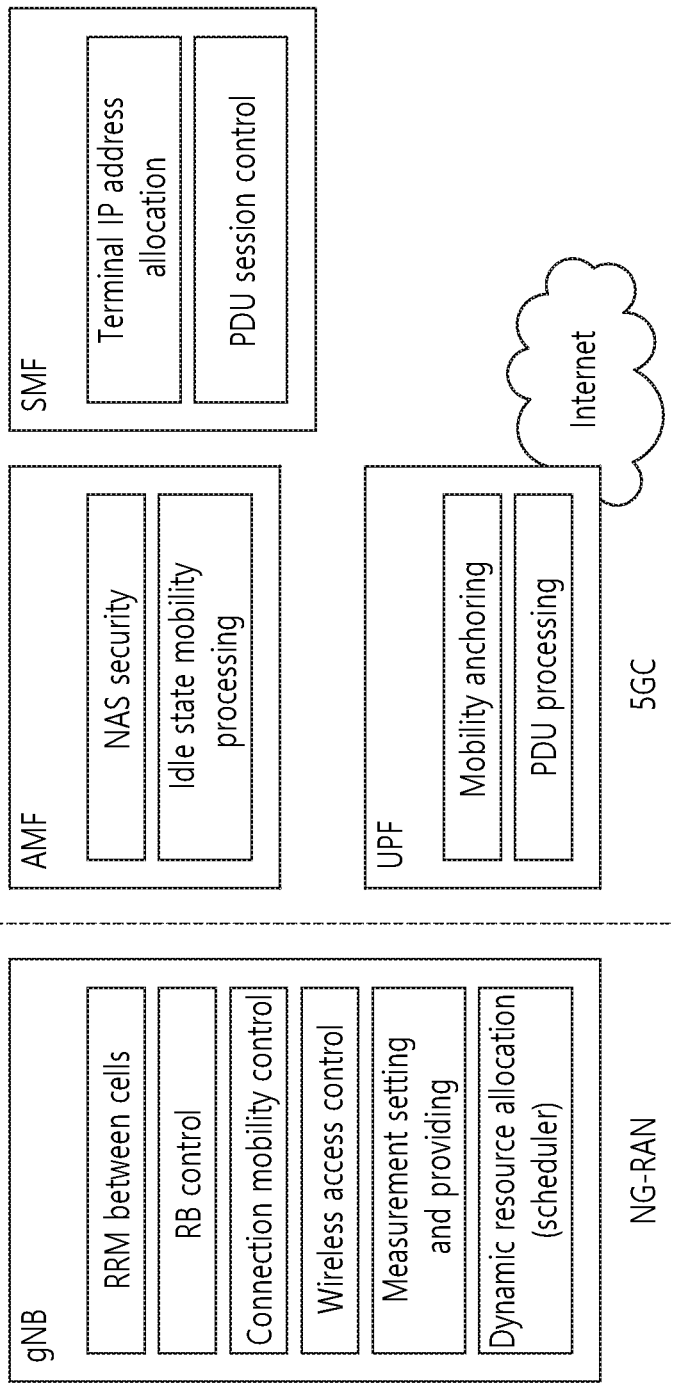
FIG. 5 illustrates functional partitioning between NG-RAN and 5GC.

FIG. 5 illustrates functional partitioning between NG-RAN and 5GC.

Referring to FIG. 5, the gNB may provide inter-cell radio resource management (RRM), radio bearer (RB) control, connection mobility control, radio access control, measurement configuration & provision, dynamic resource allocation, and the like. An AMF may provide functions such as NAS security, idle state mobility handling, and the like. A UPF may provide functions such as mobility anchoring, PDU handling, and the like. A session management function (SMF) may provide functions such as UE IP address allocation, PDU session control, and the like.

<D2D (Device-to-Device) Operation>

Hereinafter, it is described the components for device-to-device communication (D2D) technique.

Figure 6:
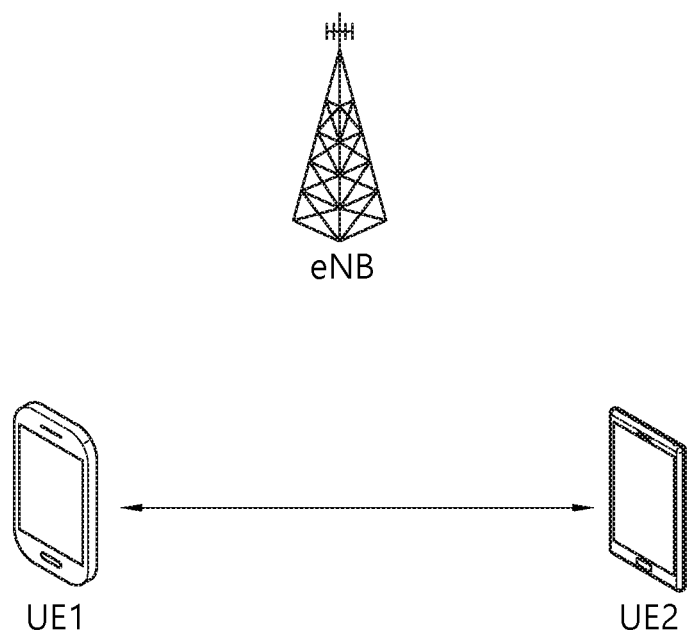
FIG. 6 illustrates a system architecture to which a D2D operation is applied.

FIG. 6 illustrates a system architecture to which a D2D operation is applied.

In FIG. 6, a UE means a user UE, but in the case that a network equipment like an eNB transmits and receives a signal according to a communication scheme between UEs, the network equipment like an eNB may also be regarded as a kind of UE.

Hereinafter, UE1 may be operated to select a resource unit corresponding to a specific resource in a resource pool that means a set of a series of resources and transmit a D2D signal by using the corresponding resource unit.

UE2, which is a reception UE for the transmission, may be configured with a resource pool in which UE1 may transmit a signal and may detect the signal of UE1.

Here, the resource pool may be informed by an eNB in the case that UE1 is within a connection coverage of the eNB, and may be informed by another UE or determined as a predetermined resource in the case that UE 1 is out of a connection coverage of the eNB.

Generally, a resource pool includes multiple resource units, and each UE may select one or multiple resource units and use the one or multiple resource units in its own D2D signal transmission.

Figure 7:
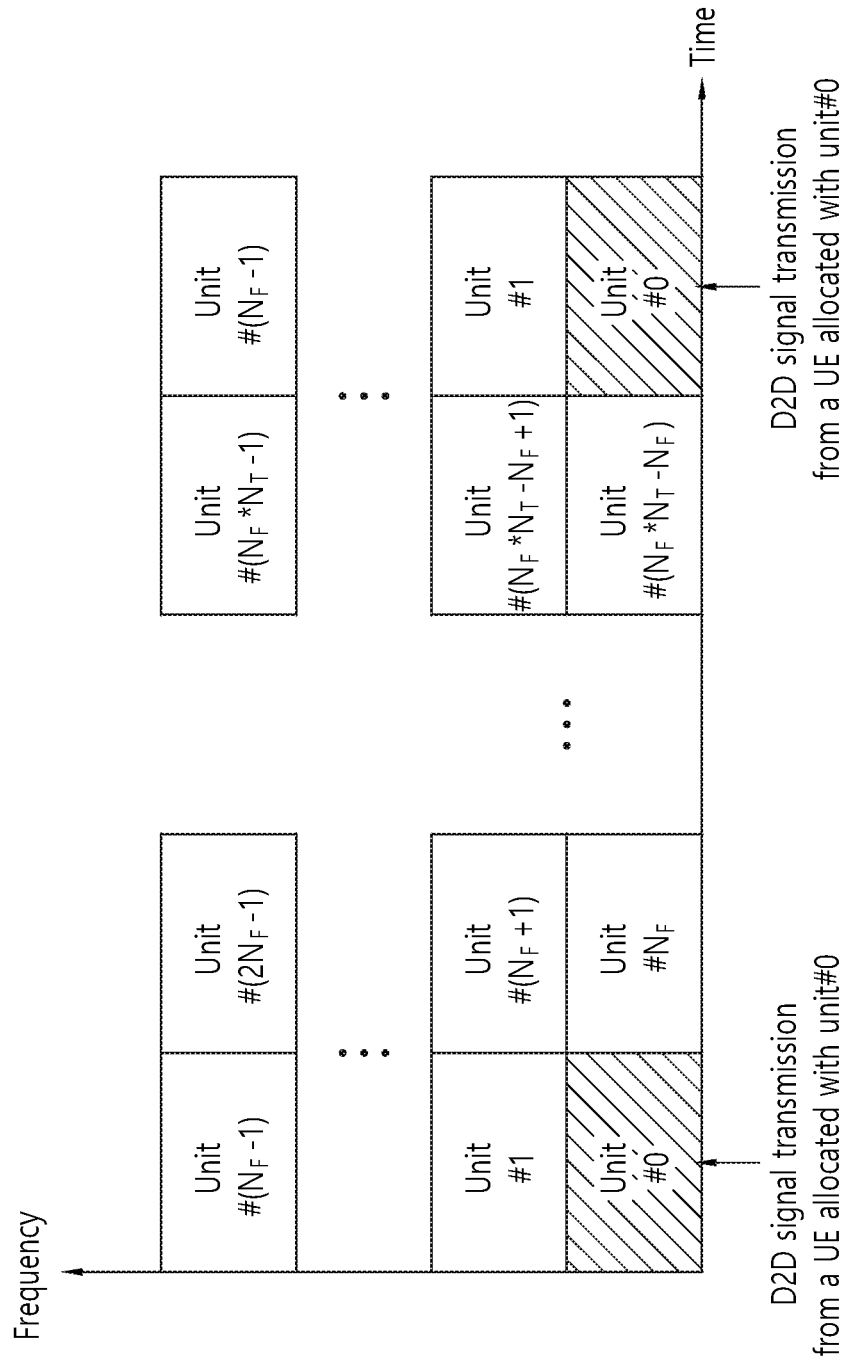
FIG. 7 illustrates an example of a resource unit on time and frequency resource.

FIG. 7 illustrates an example of a resource unit on time and frequency resource.

The example of FIG. 7 corresponds to the case that the entire frequency resource resources are divided by $N_F$, and the entire time resources are divided by $N_T$, and accordingly total $N_F*N_T$ resource units are defined.

In the example of FIG. 7, the resource pool is repeated in a period of $N_T$ subframe. Distinctively, a single resource unit may be present repeatedly as shown in FIG. 7. Alternatively, in order to obtain diversity effect in a time or frequency domain, an index of a physical resource unit which is mapped to a single logical resource unit may be changed in a predetermined pattern depending on a time.

In such a resource unit architecture, a resource pool may mean a set of resource units that a UE intended to transmit a D2D signal uses in a transmission.

The resource pool described above may be sub divided into several types. First, the resource pool may be distinguished according to a content of a D2D signal which is transmitted in each resource pool.

As an example, the contents of the following D2D signal may be distinguished, and a separate resource pool may be configured for each of them.

Scheduling Assignment (SA) or D2D (Sidelink) Control Channel:

A signal including information such as a position of resource of a D2D data channel transmitted in a subsequent or a same subframe (SF) by each transmission UE, MCS (modulation and coding scheme) or MIMO (Multiple Input Multiple Output) transmission scheme required to demodulate other data channel, and a timing advance.

This signal may be transmitted with being multiplexed with D2D data on the same resource unit, and in this case, a SA resource pool may mean a pool of resources in which SA and D2D data are multiplexed and transmitted. This may also be called the other name, D2D (sidelink) control channel.

D2D Data Channel:

A pool of resources that a transmission UE uses for transmitting user data by using a resource designated by SA.

In the case that it is available to be multiplexed with D2D data and transmitted on the same resource unit, in the resource pool for D2D data channel, only the D2D data channel excluding SA information is transmitted.

In other words, the resource element which was used for transmitting the SA information in an individual resource unit in a SA resource pool is still used for transmitting D2D data in the D2D data channel resource pool.

Discovery Channel:

A resource pool for a message in which information such as an ID of a transmission UE is transmitted and enables for an adjacent UE to discover the transmission UE.

Even in the case that a content of D2D signal described above is the same, depending on a transmission and reception attribute of D2D signal, different resource pool may be used.

As an example, even in the case of the same D2D data channel or a discovery message, depending on a transmission timing determination scheme of a D2D signal (e.g., whether it is transmitted on a reception timing of synchronization reference signal or transmitted by applying a predetermined timing advance), a resource allocation scheme (e.g., whether a transport resource of an individual signal is designated by an eNB to an individual transmission UE or an individual transmission UE selects an individual signal transport resource autonomously in a pool), a signal format (e.g., the number of symbols occupied by each D2D signal in a subframe or the number of subframes used for transmitting a single D2D signal), a signal strength from an eNB or a transmission power strength of a D2D UE, it may be further distinguished as different resource pool.

For the convenience of description, in a D2D communication, a method that an eNB directly indicates a transport resource of a D2D transmission UE is called Mode 1, and a transport resource region is preconfigured or a method that an eNB designates a transport resource region and a UE directly selects a transport resource is called Mode 2.

For a D2D discovery, a case that an eNB directly indicates a resource is called Type 2, and a case that a UE directly selects a transport resource in a preconfigured resource region, or a resource region indicated by an eNB is called Type 1.

The above mentioned D2D may also be called sidelink, and SA may be called physical sidelink control channel (PSCCH). A D2D synchronization signal may be called sidelink synchronization signal (SSS), and the control channel for transmitting the most basic information before a D2D communication transmitted with the SSS may be called Physical sidelink broadcast channel (PSBCH), or in other name, Physical D2D synchronization channel (PD2DSCH).

A signal for a specific UE to inform that the UE is present in a neighbor may include an ID of the specific UE, and such a channel may be called physical sidelink discovery channel (PSDCH).

In Rel. 12 D2D, only a D2D communication UE transmits PSBCH together with SSS, and owing to this, a measurement of SSS is performed by using a DMRS of PSBCH. An out-coverage UE measures a DMRS of PSBCH and measures RSRP of the signal and determines whether the UE itself becomes a synchronization source.

<NR (New RAT)>

As more communication devices require a greater communication capacity, there emerges a need for enhanced mobile broadband communication compared to the existing radio access technology (RAT). In addition, massive machine type communications (MTC) providing various services anywhere and at any time by connecting multiple devices and things is also one of important issues to be taken into consideration in the next-generation communication. Furthermore, the design of a communication system in which services/UEs sensitive to reliability and latency are taken into consideration is also discussed.

As described above, the introduction of a next-generation RAT in which enhanced mobile broadband (eMBB) communication, massive MTC (mMTC) and ultra-reliable and low latency communication (URLLC) are taken into consideration is now discussed. In the present disclosure, the corresponding technology is commonly called NR, for convenience sake.

<Frame Structure for NR>

Figure 8:
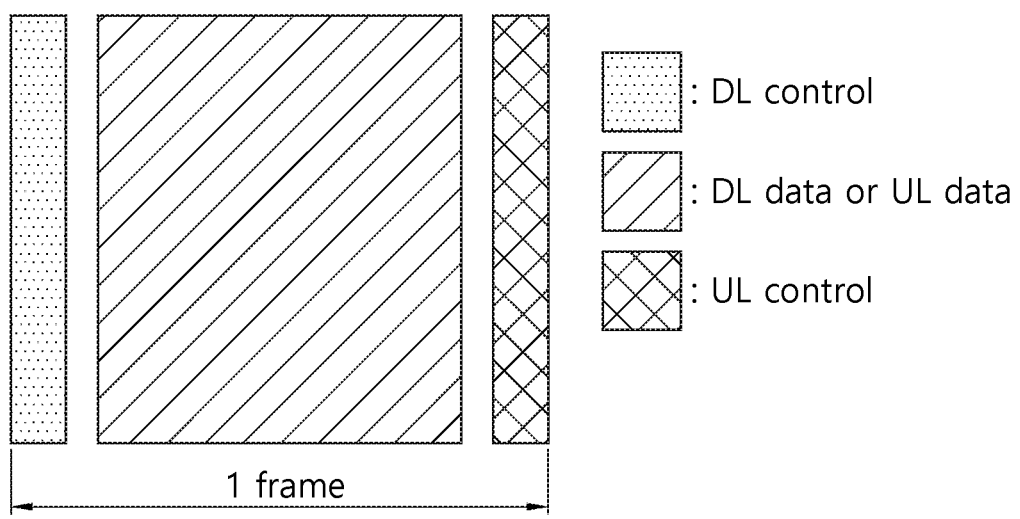
FIG. 8 schematically illustrates an example of a frame structure in the NR system.

FIG. 8 schematically illustrates an example of a frame structure in the NR system.

Referring to FIG. 8, the frame structure of NR is characterized in the self-contained structure that includes all of DL control channel, DL or UL data, UL control channel, and the like in a single frame unit.

At this time, in the DL control channel, DL data scheduling information, UL data scheduling information, and the like may be transmitted, and in the UL control channel, ACK/NACK information for DL data, CSI information (modulation and coding scheme information, MIMO transmission related information, etc.), a scheduling request, and the like may be transmitted.

In FIG. 8, a time gap for DL-to-UL or UL-to-DL switching may be present between the control region and the data region.

In addition, one of DL control/DL data/UL data/UL control may not be configured in a single frame. Alternatively, an order for each channel (e.g., DL control/DL data/UL control/UL data or UL control/UL data/DL control/DL data, etc.) included in a single frame may be changed.

Figure 9:
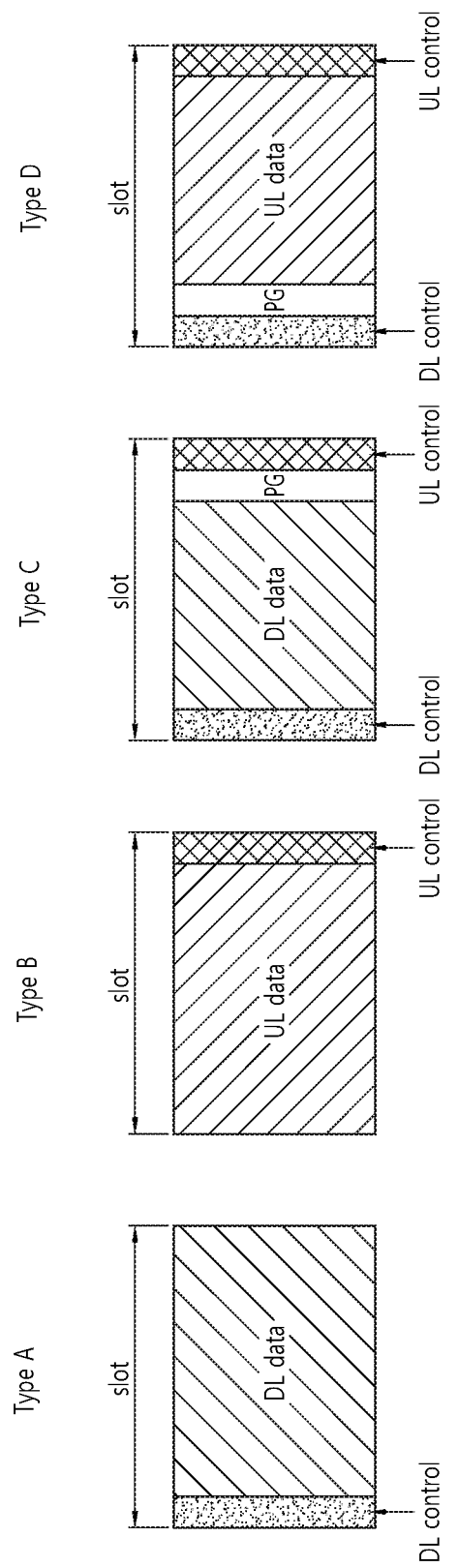
FIG. 9 schematically illustrates another example of a frame structure in the NR system.

The frame structure of the NR system described with the example of FIG. 8 may be distinguished into 4 types as shown in FIG. 9, largely.

FIG. 9 schematically illustrates another example of a frame structure in the NR system.

Type A: DL control+DL data

That is, according to Type A, a single slot (or frame) includes a DL control region and a DL data region.

Type B: UL data+UL control

That is, according to Type B, a single slot (or frame) includes a UL data region and a UL control region. Here, the UL control may be omitted in dynamic manner.

Type C: DL control+DL data+GP (guard period)+UL control

That is, according to Type C, a single slot (or frame) includes a DL control region, a DL data region, a GP (guard period) region and a UL control region.

Type D: DL control+GP+UL data+UL control

That is, according to Type D, a single slot (or frame) includes a DL control region, a GP region, a UL data region and a UL control region. Here, the positions of the UL data and the UL control may be changed, or the UL control may be omitted in dynamic manner.

<Analog Beamforming>

In a millimeter wave (mmW) system, since a wavelength is short, multiple antenna elements may be installed in the same area. That is, considering that the wavelength at 30 GHz band is 1 cm, a total of 100 antenna elements may be installed in a 5 by 5 cm panel at intervals of 0.5 lambda (wavelength) in the case of a 2-dimensional array. Therefore, in the mmW system, it is available to improve the coverage or throughput by increasing the beamforming (BF) gain using multiple antenna elements.

In this case, in the case that each antenna element may include a transceiver unit (TXRU) to enable adjustment of transmit power and phase, independent beamforming per frequency resource is available. However, installing TXRUs in all of the about 100 antenna elements is less feasible in terms of cost. Therefore, a method of mapping a plurality of antenna elements to one TXRU and adjusting a direction of a beam using an analog phase shifter has been considered. However, the analog beamforming method is disadvantageous in that frequency selective beamforming is impossible because only one beam direction is generated over the entire band.

As an intermediate form of digital beamforming (BF) and analog beamforming (BF), hybrid BF with B TXRUs that are fewer than Q antenna elements may be considered. In this case, the number of beam directions that can be transmitted at the same time is limited to B or less, which depends on the connection scheme of B TXRUs and Q antenna elements.

Hereinafter, the present disclosure is described.

The D2D communication described above may be extended and applied in a signal transmission and reception between vehicles, and specifically, the communication related to a VEHICLE is called VEHICLE-TO-EVERYTHING (V2X) communication. The term 'X' in the V2X means PEDESTRIAN (COMMUNICATION BETWEEN A VEHICLE AND A DEVICE CARRIED BY AN INDIVIDUAL (e.g., HANDHELD TERMINAL CARRIED BY A PEDESTRIAN, CYCLIST, DRIVER OR PASSENGER), at this time, V2X may be rewritten by V2P), VEHICLE (COMMUNICATION BETWEEN VEHICLES) (V2V), INFRASTRUCTURE/NETWORK (COMMUNICATION BETWEEN A VEHICLE AND A ROADSIDE UNIT (RSU)/NETWORK, e.g., RSU IS A TRANSPORTATION INFRASTRUCTURE ENTITY, e.g., AN ENTITY TRANSMITTING SPEED NOTIFICATIONS) IMPLEMENTED IN AN eNB OR A STATIONARY UE)) (V2I/N). The (V2P communication related) device owned by a PEDESTRIAN (or a person) is referred to as "P-UE" and the (V2P communication related) device installed in a VEHICLE is referred to as "V-US". In the present disclosure, the term 'ENTITY' may be interpreted as at least one of P-UE, V-UE, and RSU (/NETWORK/INFRASTRUCTURE).

Figure 10:
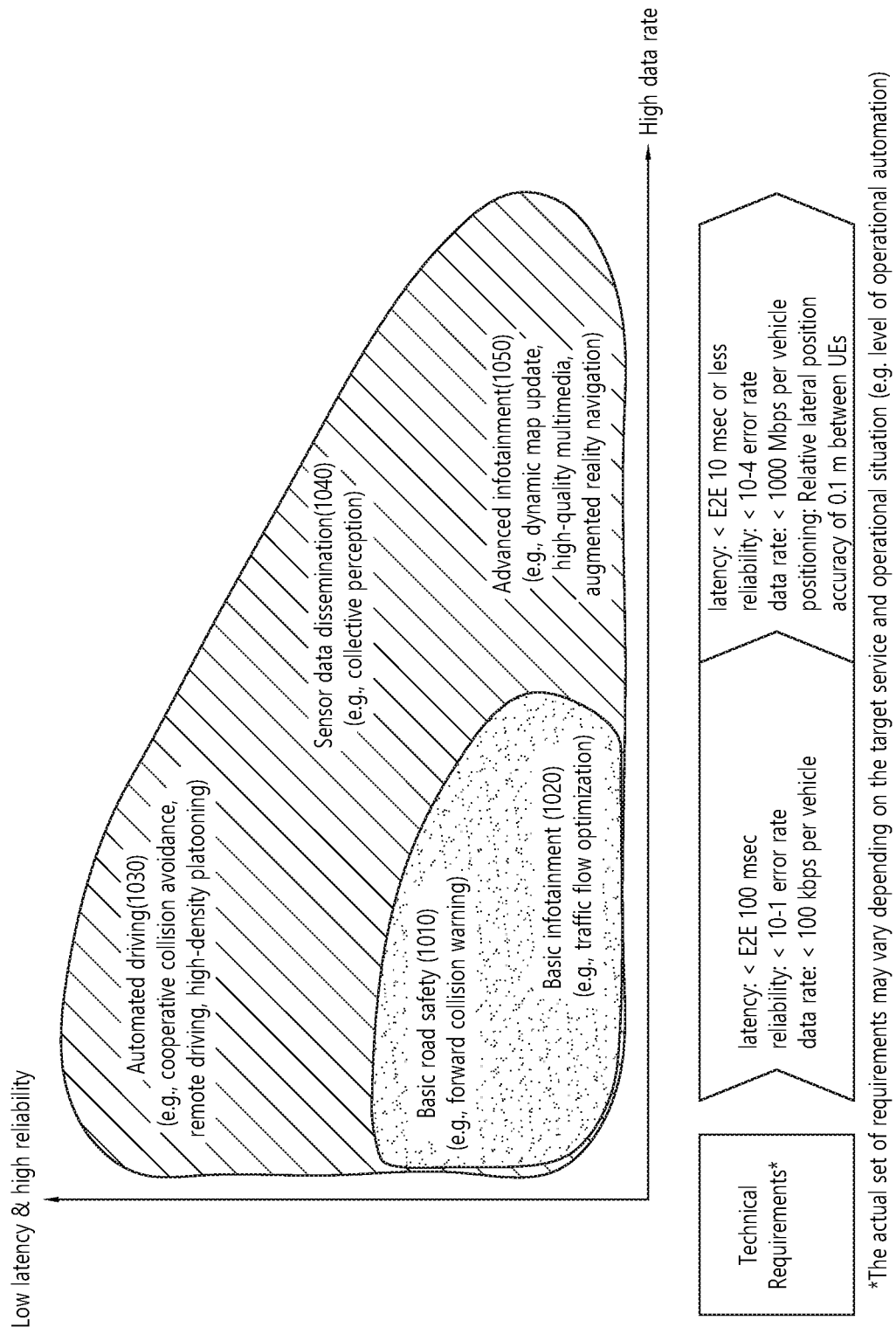
FIG. 10 schematically illustrates types of V2X service and requirements therefor.

FIG. 10 schematically illustrates types of V2X service and requirements therefor.

Referring to FIG. 10, types of service supported in V2X may be represented by a graph having an axis of latency and reliability (i.e., vertical axis of FIG. 10) and another axis of data rate (i.e., horizontal axis of FIG. 10).

First, as an example of the types of service supported in V2X, use cases may be present such as Basic road safety 1010 and/or Basic infotainment 1020 that requires latency lower than E2E (end-to-end) 100 msec, reliability of lower than $10^{-1}$ error rate and/or data latency of lower than 100 kbps per vehicle.

Here, an example of the Basic road safety 1010 may include forward collision warning, and the like. An example of the Basic infotainment 1020 may include traffic flow optimization, and the like.

In addition, as another example of the types of service supported in V2X, use cases may be present such as Automated driving 1030, Sensor data dissemination 1040 and/or Advanced infotainment 1050 that requires latency lower than E2E (end-to-end) 10 msec, reliability of lower than $10^{-4}$ error rate, data latency of lower than 1000 kbps per vehicle and/or relative position accuracy of 0.1 m between UEs.

Here, an example of the Automated driving 1030 may include cooperative collision avoidance, remote driving, high-density platooning, and the like. An example of the Sensor data dissemination 1040 may include collective perception, and the like. An example of the Advanced infotainment 1050 may include dynamic map update, high-quality multimedia, augmented reality navigation, and the like.

Meanwhile, among the V2X use cases, for example, the use cases that require a data transmission requiring high data rate such as sensor data sharing or infotainment may be present.

In the situation that requires high data rate as such, it may occur cases in which the target data rate required by the uses cases is unavailable to be satisfied with the data transmission scheme through a single carrier which has been considered in the current V2X operation.

As a solution for it, Carrier Aggregation (CA) technique may be considered, in which a V2X UE performs transmission of large amount of data through multiple carriers. In such a CA technique, each of the carriers used in the CA may be called a component carrier.

There are several issues for the CA operation in a V2X communication system. One of the issues is for synchronization reference (e.g., GNSS, eNB, etc.) of each component carrier.

There is a solution for the issue; in the case that a transmission UE (e.g., transmission V2X UE) transmits a packet for the CA with multiple carriers, a single synchronization reference is used for each carrier to be used in the CA.

That is, in the aspect of transmission UE, a single synchronization reference may be used for all aggregation carriers. At this time, when a UE transmits several MAC-PDUs in several carriers, a timing may be arranged in all transmission carriers.

Meanwhile, even in the case that a single synchronization reference is used as in the solution proposed above, since synchronization (time/frequency) of the packet transmitted in a specific component carrier using the reference is different from synchronization (time/frequency) of other neighboring UEs (existing legacy UEs), a problem may occur that the packet exerts as an interference signal to the other neighboring UEs or other UEs without CA capability.

For easier understanding, the problem is described with an example as below. For example, it is assumed that transmission UE1 (advanced V2X UE in which CA operation is allowed) transmits a packet using carrier 1 and carrier 2 for the CA operation. In this case, when a synchronization reference is carrier 1, carrier 2 also transmits a packet in accordance with synchronization (time/frequency) from the reference (i.e., carrier 1).

The data of carrier 2 transmitted in the above scheme (i.e., transmitted with a reference of carrier 1) may exert as an interference signal to an existing other UE2 (e.g., a legacy UE, a UE without CA capability or a UE not performing CA operation). Owing to the reason, the following situation may occur.

UE1 may transmit data in carrier 1 and carrier 2 based on the synchronization reference (carrier 1), but when reception UE2 receives data transmitted by other UEs through carrier 2, reception UE2 is unavailable to receive data in accordance with a Side Link Synchronization Signal (SLSS) transmitted by other UEs. Owing to this, UE2 may have a synchronization which is different from the data transmitted to carrier 2 by UE1.

In other words, even in the case that UE1 transmits data with the same synchronization on carrier 1 and carrier 2 for the CA operation, UE2 may receive other data with carrier 2. In this case, a situation occurs that the synchronization for which UE1 transmits to carrier 2 is different from the synchronization for which UE2 observes from other UEs (i.e., asynchronous situation), and in the case that a difference between the synchronizations exceeds a CP boundary, the data that UE1 transmits to carrier 2 exerts as an interference to UE2. Accordingly, when UE2 performs a reception with carrier 2, there is a problem that a performance degradation occurs owing to the data of UE1 transmitted with different synchronization.

Furthermore, the problem described above still occurs in the scenario that UE 1 transmits a SLSS only in a carrier reference (i.e., transmits SLSS only with the reference carrier) and transmits data only in the other component carrier. For example, in the case that UE1 also transmits a SLSS in the other component carrier, other UE (legacy UE or UE without CA capability) may establish a new synchronization cluster, but otherwise, asynchronous situation may still be occurred.

Accordingly, the present disclosure proposes a method for solving the problem that a transmission using only a synchronization reference exerts as an interference signal to other UEs in a specific component carrier, when a transmission UE selects and transmits a plurality of component carriers for (e)V2X communication.

In order to solve the problem described above, the following solutions are proposed.

[Solution 1]: In order to prevent from exerting as an interference signal to other UEs, a transmission UE may reduce a transmission power of a part of (or the entire) carriers among the carriers except the carrier used as a synchronization reference among multiple-carrier to be used for the CA, or a transmission packet is dropped in a part of (or the entire) carriers. Here, the part of carriers may be the entire asynchronous carriers or a part of the asynchronous carriers.

Here, a selection for the part of or the entire carriers may be performed based on PPPP or CBR.

For understanding Solution 1, the solution above is described with reference to a drawing as below.

Figure 11:
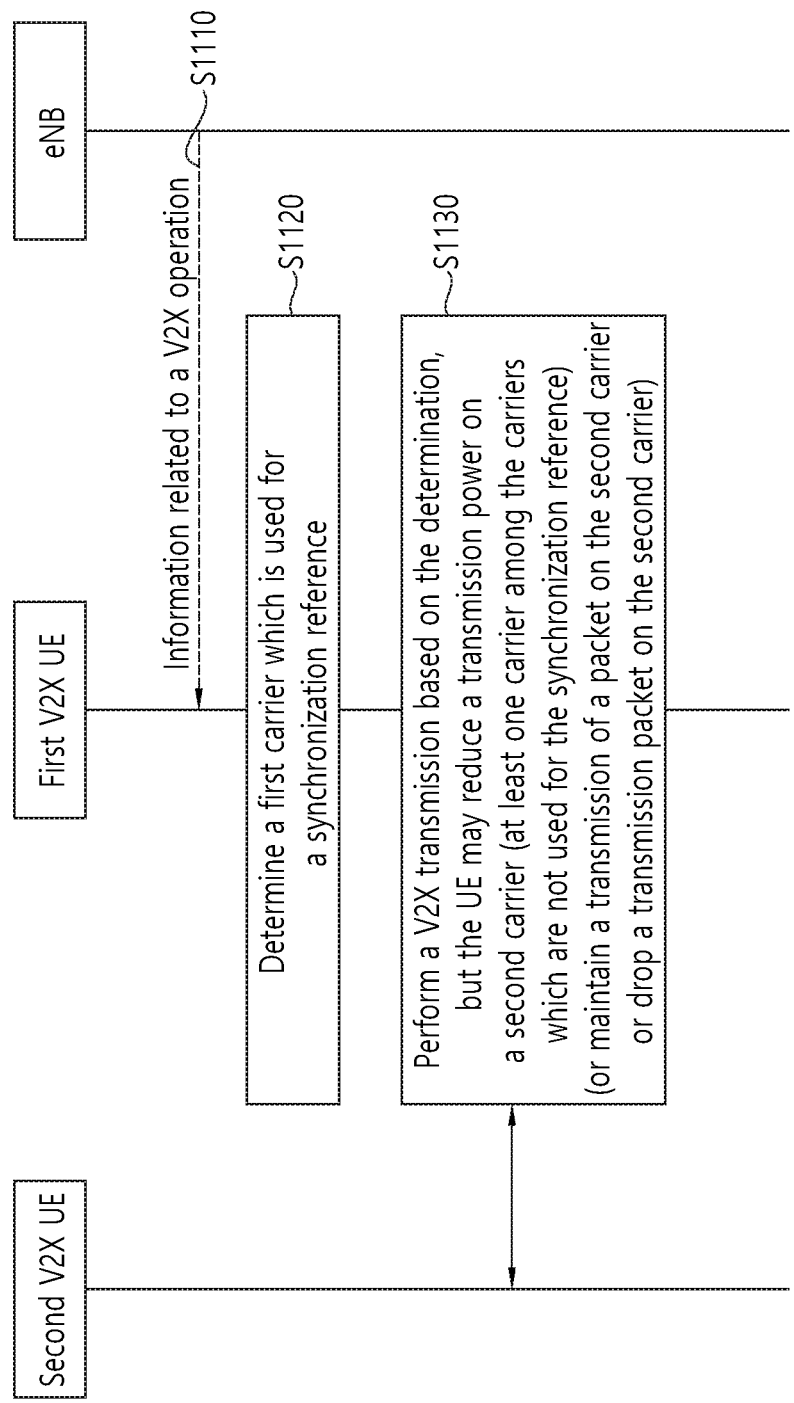
FIG. 11 is a flowchart for a method for performing a V2X transmission on an asynchronous carrier according to an embodiment of the present disclosure.

FIG. 11 is a flowchart for a method for performing a V2X transmission on an asynchronous carrier according to an embodiment of the present disclosure.

Referring to FIG. 11, a first V2X UE (here, for the convenience of description, the first V2X UE may be used with 'transmission UE' in a mixed manner) may receive information related to a V2X operation from an eNB (step, S1110). Here, the operation for the UE to receive the information related to a V2X operation from the eNB does not correspond to an essential operation. That is, the information related to a V2X operation above may be preconfigured to the UE.

Here, the information related to a V2X operation may mean information required when a V2X UE performs a V2X operation (including transmission, etc.), and the information related to a V2X operation above may be transferred through a predefined signal (e.g., through a physical layer signal or a higher layer signal (e.g., signal in an RRC layer)).

The first V2X UE may determine a first carrier which is used for a synchronization reference (step, S1120). Here, the detailed description for the synchronization reference and the carrier used for the synchronization reference is as described above, and the repeated description is omitted for the convenience of description.

Later, the first V2X UE may perform a V2X transmission based on the determination, but the UE may reduce a transmission power on a second carrier (at least one carrier among the carriers which are not used for the synchronization reference) (or maintain a transmission of a packet on the second carrier or drop a transmission packet on the second carrier) (step, S1130). For example, the first V2X UE may perform a V2X transmission on the first carrier based on the first carrier used for the synchronization reference. In this case, the first UE may perform a V2X transmission operation based on the examples described below on the second carrier (e.g., reduce a transmission power on the second carrier or drop a transmission packet on the second carrier). Here, as described above, a second V2X UE may correspond to a UE that does not support the CA, for example (of course, the case that the second V2X UE supports the CA is not excluded from the scope of the present disclosure).

In this case, a channel busy ratio (CBR) may be used as a criterion for reducing the transmission power or dropping the transmission packet on the second carrier among a plurality of carriers. The detailed description therefor is described below.

In this case, a ProSe per-packet priority (PPPP) may be used as a criterion for reducing the transmission power or dropping the transmission packet on the second carrier among a plurality of carriers. The detailed description therefor is described below.

In this case, a carrier other than the second carrier among carriers not used as the synchronization reference may be a third carrier, and the UE may transmit a Side Link Synchronization Signal (SLSS) on the third carrier. Of course, the UE may also transmit a SLSS even on the third carrier among a plurality of carriers. Here, a channel busy ratio (CBR) or a ProSe per-packet priority (PPPP) may be used as a criterion for reducing the transmission power or dropping the transmission packet on the third carrier among a plurality of carriers. The detailed description therefor is described below.

In this case, the UE may reduce the transmission power or drop the transmission packet on the second carrier based on the transmission power of a SLSS transmitted by another UE (e.g., the second V2X UE in FIG. 11). The detailed description therefor is described below.

In this case, the UE may reduce the transmission power or drop the packet on the second carrier based on a field value of a priority in a Side Link Synchronization Signal (SLSS) transmitted by another UE (e.g., the second V2X UE in FIG. 11). In this case, in the case that the field value of the priority is higher than a specific threshold, the UE may transmit a data together with the SLSS or only the data, and in the case that the field value of the priority is lower than the specific threshold, the UE may reduce the transmission power on the second carrier or drop the packet. The detailed description therefor is described below.

The contents are described in more detail as below.

First, PPPP among multiple carriers (entire carriers or entire carriers excluding a synchronization reference) may be a criterion of transmission power adjustment and drop of a specific carrier.

For example, the scenario is described that a UE performs a transmission based on the CA on two carriers as below.

When carrier 1 (or represented as a first carrier as described above) (carrier 1 in this case corresponds to a synchronization reference) is synchronous, and carrier 2 (or represented as a second carrier as described above) is asynchronous as in the above-mentioned situation, in the case that the priority of carrier 1 is higher than the priority of carrier 2 by a comparison of PPPP, an operation may be performed such as a transmission power of carrier 2 is adjusted, or a transmission packet is dropped.

Alternatively, in the case that the priority of a specific carrier is higher (or lower) than a predefined value, not by the comparison of PPPP, or in the case that the priority of a specific carrier is within a specific range, the above operation may be performed.

Here, it may be an issue how the transmission UE knows priority information of each carrier. For this, the priority information of each carrier may be preconfigured (e.g., through RRC signaling), or the priority information of each carrier may be known through a field of PSBCH. Here, the field of PSBCH may be in and/or out-coverage indicator (or coverage information), synchronization indicator (or synchronization information), for example. For this, UEs may set a specific field as a transmittable highest level in PSBCH.

Alternatively, a UE in coverage may also know the priority information of each carrier through the control information of PDCCH. Through the pre-configuration or indication information, a UE may know an importance of each carrier and perform the operation.

In such an operation of a transmission UE, a point that CBR may be a criterion may be as below. For example, in a situation that an asynchronous carrier is present, in the case that CBR measured by a transmission UE is higher than a specific threshold, an operation may be considered that a transmission power for an asynchronous carrier may be reduced or dropped. On the other hand, in the case that CBR is lower than a specific threshold, even in the case that it exerts as an interference signal, a UE may perform a packet transmission in the asynchronous carrier without any change.

An example that a UE performs a V2X transmission on an asynchronous carrier based on CBR is particularly applied to the flow of FIG. 11 and described as below. For example, a first V2X UE determines a first carrier which is used as a synchronous carrier and performs a V2X transmission based on the determination, but in the case that CBR of the first V2X UE is lower than (or equal to or lower than) a specific threshold, a packet transmission is performed without any change on a second carrier (at least one carrier among the carriers which are not used as the synchronous reference), and in the case that CBR of the first UE is higher (or equal to or higher than) a specific threshold, a transmission power on the second carrier may be reduced, or a transmission packet on the second carrier may be dropped.

In addition to [Solution 1] described above (or independently), the following solutions may be proposed.

[Solution 2]: A data transmitted in an asynchronous carrier exerts as an interference signal to other UEs, but a transmission UE may not drop but transmit a packet of each component carrier.

However, a UE in this case may transmit a SLSS for each component carrier. In this way, the existing UEs may attempt to reform a synchronous cluster through the transmitted SLSS by the UE. Here, PPPP or CBR may be a criterion on whether to transmit or not transmit a SLSS in each component.

An operation in Solution 2 is similar to the scheme described in Solution 1 described above.

A point that PPPP may be a criterion may be as below. As an example, based on a comparison between carriers, in the case that priority information in an asynchronous carrier is i) higher than (or equal to or higher than, or lower, or equal to or lower than) a threshold, or ii) higher than a priority of a synchronization reference carrier, or iii) within a specific priority range, a SLSS is transmitted on the asynchronous carrier for transmitting (or informing) synchronization information to other UEs.

As a criterion for CBR, in the case that CBR measured by a transmission UE is lower than (or higher than) a specific threshold, an operation may be considered that a SLSS is transmitted to asynchronous carrier (or the entire carrier).

In addition, as an example, regardless of the conditions described above, a transmission UE may transmit a SLSS on an asynchronous carrier in any condition or reduce or drop a transmission power as in [Solution 1].

[Solution 3]: A transmission UE measures a power of SLSS transmitted by other UEs in an asynchronous carrier in multiple carriers for CA operation, and in the case that the measured power is higher than (or equal to or higher than) a specific threshold, the transmission UE identifies that other UEs are close, and may lower a transmission power of a packet to be transmitted in the asynchronous carrier or drop the packet.

On the other hand, in the case that a transmission power is lower than a specific threshold, a transmission UE identifies that other UEs are far away and may transmit a data in the asynchronous carrier without any change or transmit a data and a SLSS.

The contents for [Solution 3] is particularly applied to the flow of FIG. 11 and described as below. For example, a first V2X UE determines a first carrier which is used as a synchronous carrier and performs a V2X transmission based on the determination, but in the case that the SLSS power transmitted by other UEs on a second carrier (at least one carrier among the carriers which are not used as the synchronous reference) is lower than a specific threshold, the first V2X UE may perform a packet transmission on the second carrier without any change or transmit the SLSS related to the first V2X UE with a packet. In the case that SLSS power transmitted by other UEs on the second carrier is higher than a specific threshold, the first V2X UE may reduce a transmission power on the second carrier (in this case, the first V2X UE may also transmit a SLSS while reducing the transmission power) or drop a transmission packet on the second carrier.

[Solution 4]: Through a priority of SLSS transmitted by other UEs on an asynchronous carrier among multiple carriers for CA operation, in the case that a field value (here, the priority means that the SLSS has lower priority as the field value of the priority increases, but has higher priority as the field value of the priority decreases) of the priority is higher than a specific threshold, a transmission UE may transmit a data on the asynchronous carrier without any change or transmit a data and a SLSS. In addition, in the case that a field value of the priority of an SLSS transmitted by other UEs on an asynchronous carrier is lower than a specific threshold, a transmission UE may reduce or drop a transmission power.

Alternatively, through a comparison among a priority set of SLSSs receive from other multiple UEs (e.g., the second V2X UE in FIG. 11), a transmission UE may reduce or drop transmission powers of lower x % carriers of which field values of priorities of the received SLSSs are low. On the other hand, a transmission UE may transmit a data without any change or transmit data+SLSS in higher x % carriers.

Here, the priority of SLSS may be identified by in-coverage/out-coverage indicator of PSBCH, synchronization signal index, DM-RS RSRP, and the like.

[Solution 5]: A data transmission operation on an asynchronous carrier may be changed depending on whether a SLSS is transmitted (or available to be transmitted) in an asynchronous carrier. Here, it may be according to the solutions or preconfigured on whether to transmit a SLSS.

In the case that a transmission UE may transmit a SLSS, neighboring asynchronous UEs may be synchronized with the UE that transmits the SLSS, and accordingly, the transmission UE may transmit a data. On the other hand, in the case that the transmission UE is unable to transmit a SLSS, the asynchronous situation continues, and the transmission UE may not transmit a data or reduce data transmission power.

In addition to the criteria described in the solutions, the following matters may be criteria of solution determination.

Service type of a packet transmitted on each carrier (e.g., V2X Rel-14 only service, Rel-15 only service, or reception available service in both of Rel-14,15): For example, in the case that a specific service is a service that both of Rel-14/15 UEs have to receive, (since the specific service may be an important service as both of Rel-14/15 UEs have to receive), a data may be transmitted on an asynchronous carrier without any change.

An attribute of UE (e.g., a type of vehicle, a speed of UE): For example, in the case that a speed of vehicle is high, since an influence of interference signal owing to Doppler effect becomes greater, an operation of dropping a data in an asynchronous carrier may be performed. On the other hand, in the case that a speed of vehicle is low, a data may be transmitted in an asynchronous carrier without any change or data+SLSS may be transmitted.

A road type (e.g., URBAN grid or HIGH-WAY grid): For example, in the case of URBAN grid, owing to an interference signal increase by bundling and high UE density, a transmission power of data on an asynchronous carrier may be reduced or dropped. On the other hand, in the case of Freeway, a data may be transmitted in an asynchronous carrier without any change or data+SLSS may be transmitted.

QoS (latency requirement, reliability, etc.)

A type of UE (e.g., pedestrian, RSU, CAR, etc.)

Other service information, etc.

Solution is performed without above condition

Meanwhile, the contents of the present disclosure is not limited to a device-to-device communication but may also be used for uplink or downlink. In this case, an eNB or a relay node may use the proposed method.

Since the examples for the proposed method described above may also be included as one of implementation methods of the present disclosure, and it is apparent that the examples may be regarded as a kind of proposed methods.

In addition, the proposed methods described above may be independently implemented, but may also be implemented as a combination (or merge) of a part of the proposed methods. The information on whether to apply the proposed methods (or information for the rules of the proposed methods) may be informed through a predefined signal (e.g., physical layer signal or higher layer signal) defined from an eNB to a UE or from a transmission UE to a reception UE.

The contents of FIG. 11 is described in an aspect of the first V2X UE (i.e., transmission UE described above) as below.

Figure 12:
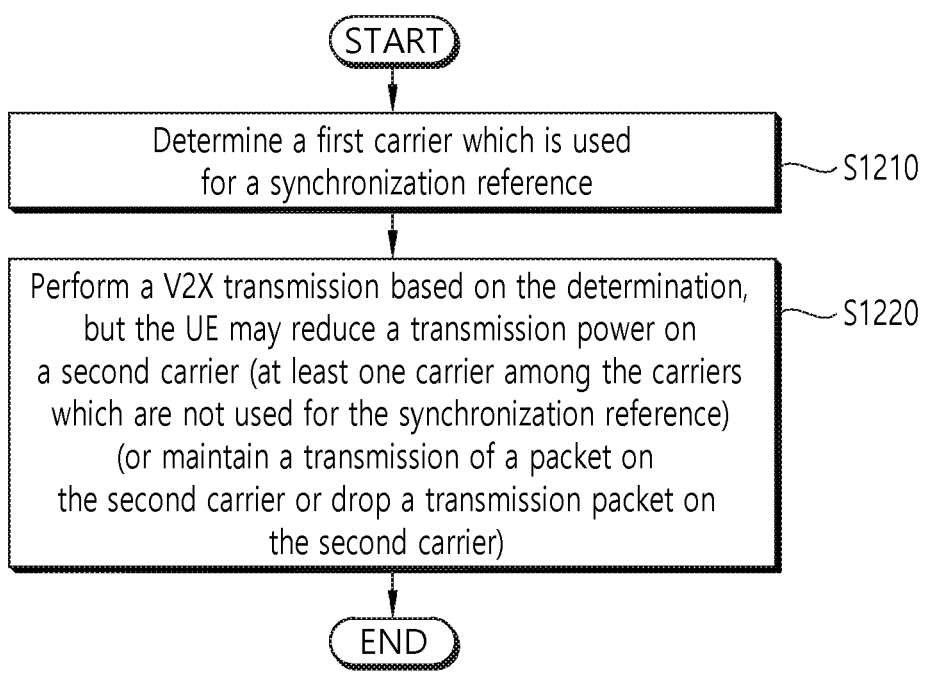
FIG. 12 is a flowchart for a method for performing a V2X transmission on an asynchronous carrier in an aspect of UE according to an embodiment of the present disclosure.

FIG. 12 is a flowchart for a method for performing a V2X transmission on an asynchronous carrier in an aspect of UE according to an embodiment of the present disclosure.

Referring to FIG. 12, a UE may determine a first carrier which is used for a synchronization reference (step, S1210). Here, a specific example in this case is as described above, and the repeated description is omitted for the convenience of description.

Later, the UE may perform a V2X transmission based on the determination, but the UE may reduce a transmission power on a second carrier (at least one carrier among the carriers which are not used for the synchronization reference) (or maintain a transmission of a packet on the second carrier or drop a transmission packet on the second carrier) (step, S1220). A specific example in this case is as described above, and the repeated description is omitted for the convenience of description.

Figure 13:
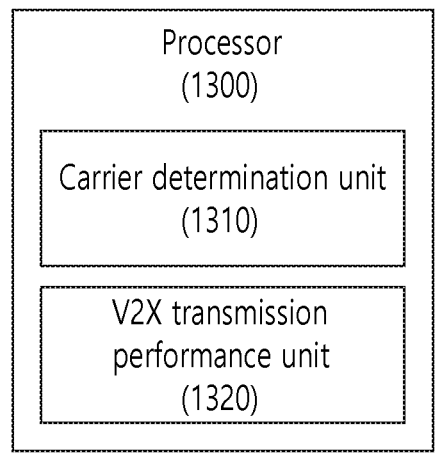
FIG. 13 is a block diagram for an example of an apparatus for performing a V2X transmission on an asynchronous carrier in an aspect of UE according to an embodiment of the present disclosure.

FIG. 13 is a block diagram for an example of an apparatus for performing a V2X transmission on an asynchronous carrier in an aspect of UE according to an embodiment of the present disclosure.

Referring to FIG. 13, a processor 1300 may include a carrier determination unit 1310 and a V2X transmission performance unit 1320. Here, the processor 1300 may mean a processor of a UE in FIG. 16 to FIG. 22 to be described below.

The carrier determination unit 1310 may determine a first carrier used as a synchronization reference. A specific example in this case is as described above, and the repeated description is omitted for the convenience of description.

The V2X transmission performance unit 1320 may perform a V2X transmission based on the determination, but the UE may reduce a transmission power on a second carrier (at least one carrier among the carriers which are not used for the synchronization reference) (or maintain a transmission of a packet on the second carrier or drop a transmission packet on the second carrier). A specific example in this case is as described above, and the repeated description is omitted for the convenience of description.

The contents of FIG. 11 is described in an aspect of an eNB as below.

Figure 14:
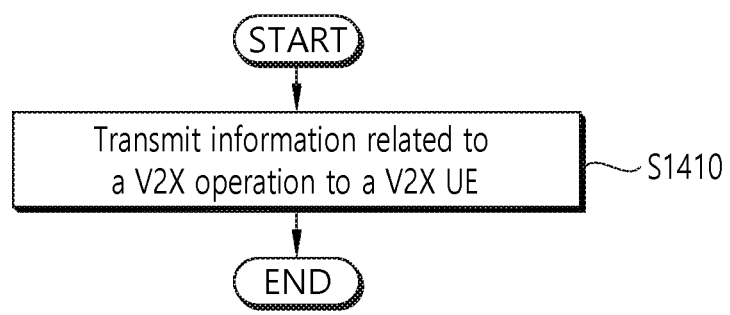
FIG. 14 is a flowchart for a method for performing a V2X transmission on an asynchronous carrier in an aspect of an eNB according to an embodiment of the present disclosure.

FIG. 14 is a flowchart for a method for performing a V2X transmission on an asynchronous carrier in an aspect of an eNB according to an embodiment of the present disclosure.

An eNB may transmit information related to a V2X operation to a V2X UE (step, S1410). Here, a specific example for the information related to a V2X operation is as described above, and the repeated description is omitted for the convenience of description.

Later, as described above, a first V2X UE may perform a V2X transmission based on the information received from the eNB.

Figure 15:
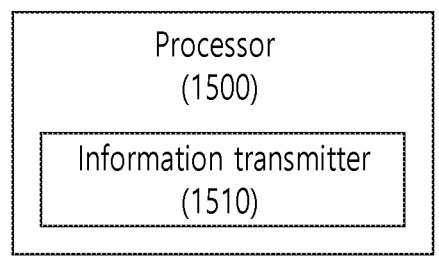
FIG. 15 is a block diagram for an example of an apparatus for performing a V2X transmission on an asynchronous carrier in an aspect of an eNB according to an embodiment of the present disclosure.

FIG. 15 is a block diagram for an example of an apparatus for performing a V2X transmission on an asynchronous carrier in an aspect of an eNB according to an embodiment of the present disclosure.

Referring to FIG. 15, a processor 1500 may include an information transmitter 1510. Here, the processor 1500 may mean a processor of an eNB in FIG. 16 to FIG. 22 to be described below.

The information transmitter 1510 may transmit information related to a V2X operation to a V2X UE (step, S1410). Here, a specific example for the information related to a V2X operation is as described above, and the repeated description is omitted for the convenience of description.

Later, as described above, a first V2X UE may perform a V2X transmission based on the information received from the eNB.

Figure 16:
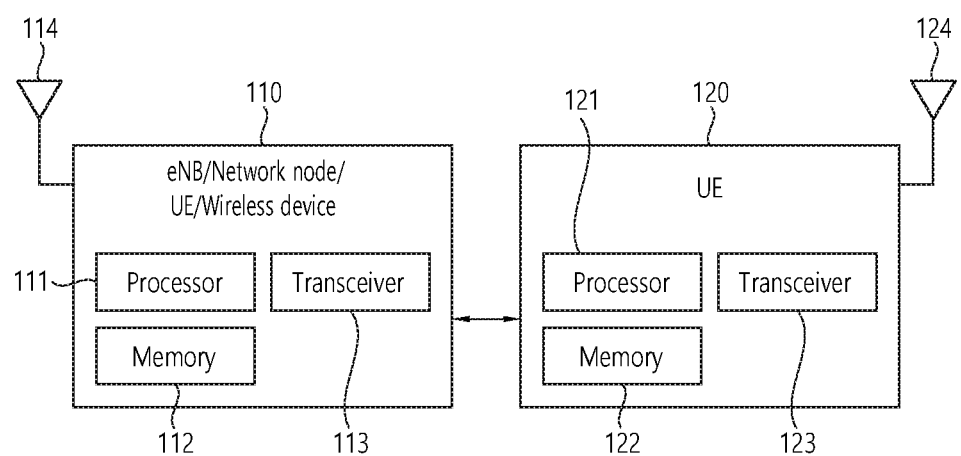
FIG. 16 is a block diagram for an example of a wireless communication apparatus according to an embodiment of the present disclosure.

FIG. 16 is a block diagram for an example of a wireless communication apparatus according to an embodiment of the present disclosure.

Referring to FIG. 16, a wireless communication system may comprise a base station 110 and a UE 120. The UE 120 may be located within coverage of the base station 110. In some use scenario, the wireless communication system may include a plurality of UEs. The example of FIG. 16 includes the base station 110 and the UE 120, but the present disclosure is not limited to the specific arrangement. For example, the base station 110 may be replaced with another network node, a UE, a wireless device, or any other entity similar to the base station 110.

The base station and the UE may represent a wireless communication device or a wireless device, respectively. The base station of FIG. 16 may be replaced with a network node, a wireless device, or a UE.

The base station 110 may include at least one processor such as the processor 111, at least one memory such as the memory 112, and at least one transceiver such as the transceiver 113. The processor 111 may perform the aforementioned functions, procedures, and/or methods shown in FIGS. 6 to 11. The processor 111 may perform one or more protocols. For example, the processor 111 may perform one or more layers (for example, functional layer) of a radio interface protocol. The memory 112 may be coupled to the processor 111 and may store various types of information and/or commands. The transceiver 113 may be coupled to the processor 111 and may be controlled to transmit and receive a radio signal.

The UE 120 may include at least one processor such as the processor 121, at least one memory such as the memory 122, and at least one transceiver such as the transceiver 123.

The processor 121 may perform the aforementioned functions, procedures, and/or methods shown in FIGS. 9 to 18. The processor 121 may perform one or more protocols. For example, the processor 121 may perform one or more layers (for example, functional layer) of a radio interface protocol. The memory 122 may be coupled to the processor 121 and may store various types of information and/or commands. The transceiver 123 may be coupled to the processor 121 and may be controlled to transmit and receive a radio signal.

The memory 112 and/or the memory 122 may be connected internally or externally to the processor 111 and/or the processor 121, respectively or may be connected to other processors through various techniques such as wired or wireless connections.

The base station 110 and/or the UE 120 may have one or more antennas. For example, the antenna 114 and/or the antenna 124 may be configured to transmit and receive a radio signal.

Figure 17:
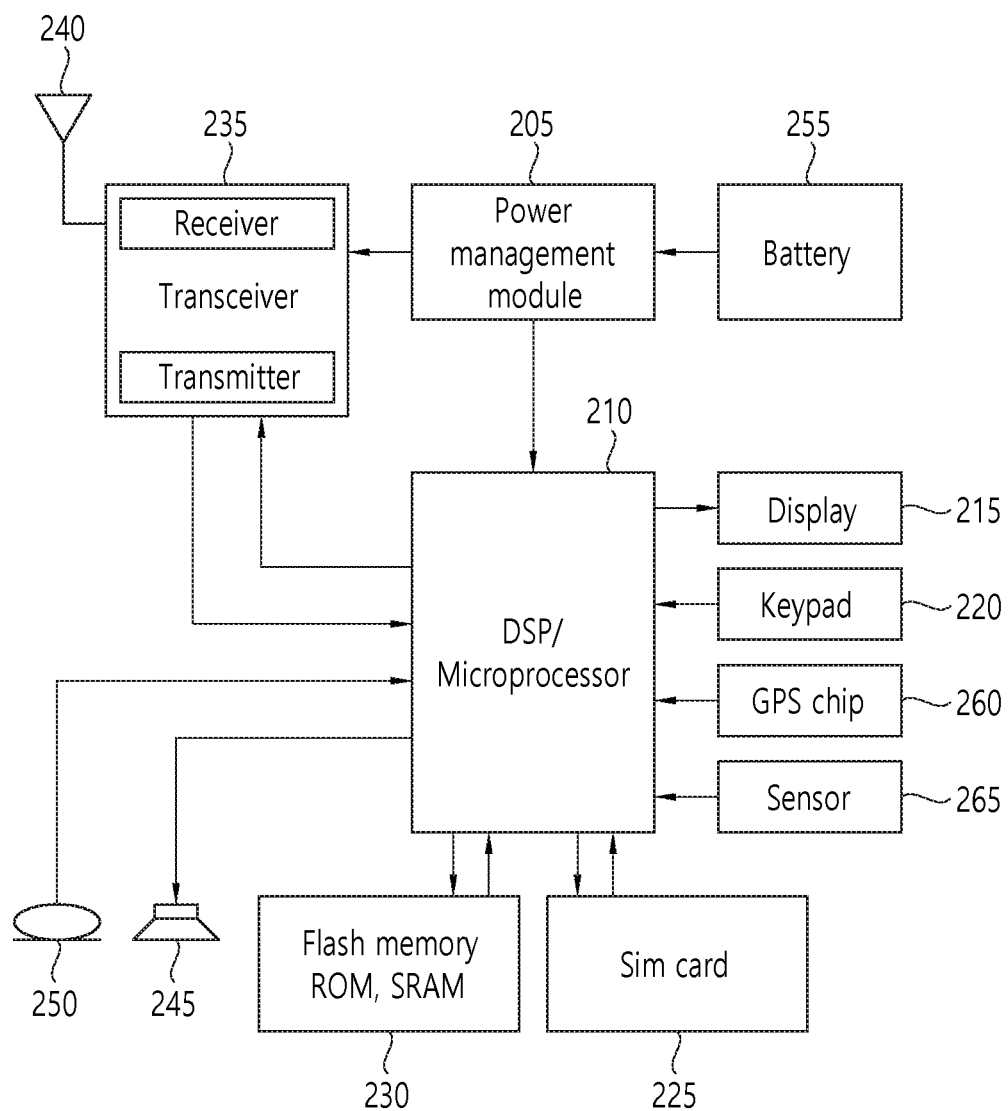
FIG. 17 is one example of a wireless communication device in which an embodiment of the present disclosure is implemented.

FIG. 17 is one example of a wireless communication device in which an embodiment of the present disclosure is implemented.

In particular, FIG. 17 illustrates the UE 100 of FIG. 16 in more detail. Like a vehicle communication system or device, a wearable device, a portable computer, or a smartphone, the UE may be a mobile computing device of arbitrary type configured suitably to perform one or more implementations of the present disclosure.

Referring to FIG. 17, the UE may comprise at least one processor such as the processor 210 (for example, a DSP or a microprocessor), a transceiver 235, a power management module 205, an antenna 240, a battery 255, a display 215, a keypad 220, a GPS chip 260, a sensor 265, a memory 230, a Subscriber Identification Module (SIM) card 225 (this element may be optional), a speaker 245, and a microphone 250. The UE may also include one or more antennas.

The processor 210 may be configured to perform the functions, processes and/or methods described with reference to FIGS. 9 to 18. Depending on the implementation example, the processor 210 may perform one or more protocols in conjunction with the layers of a radio interface protocol (for example, functional layers).

The memory 230 is connected to the processor 210 and stores information related to the operation of the processor 210. The memory may be installed inside or outside the processor and may be connected to other processors through various techniques such as wired or wireless connections.

A user may input various types of information (for example, command information such as a phone number) by pressing buttons of the keypad 220 or using various techniques such as voice activation using the microphone 250. The processor receives and processes the command information of the user and performs a proper function such as calling the phone number. As one example, data (for example, operational data) may be retrieved from the SIM card 225 or the memory 230 to perform functions. As another example, the processor may receive and process GPS information from the GPS chip 260 to perform a function associated with the position of the device, such as vehicle navigation and a map service. As yet another example, the processor may display various types of information and data on the display 215 for the reference or convenience of the user.

The transceiver 235 is connected to the processor and transmits and receives a radio signal such as a Radio Frequency (RF) signal. The processor may control the transceiver to initiate communication and transmit a radio signal including various types of information or data such as voice communication data. The transceiver includes one receiver and one transceiver to transmit or receive radio signals. The antenna 240 facilitates transmission and reception of radio signals. Depending on implementation, the transceiver may forward and convert radio signals to baseband signals to involve the processor in receiving the signals. The processed signals may be transformed by various techniques into the information that may be output and heard through the speaker 245 or into readable information.

Depending on implementation, the sensor 265 may be connected to the processor. The sensor may include one or more detection devices configured to detect various forms of information including but not limited to velocity, acceleration, light, vibration, proximity, position, and image. The processor may receive and process sensor information obtained from the sensor and perform various forms of functions such as collision prevention and automated driving.

In the example of FIG. 17, various constituting elements (for example, a camera or a USB port) may be additionally included in the UE. For example, the camera may be connected to the processor and used for various services such as automated driving and vehicle safety service.

As described above, FIG. 17 is only an example, and implementation is not limited to the specific example. For example, a few of constituting elements (for example, the keypad 220, the GPS chip 260, the sensor 265, the speaker 245 and/or the microphone 250) may not be implemented for a particular scenario.

Figure 18:
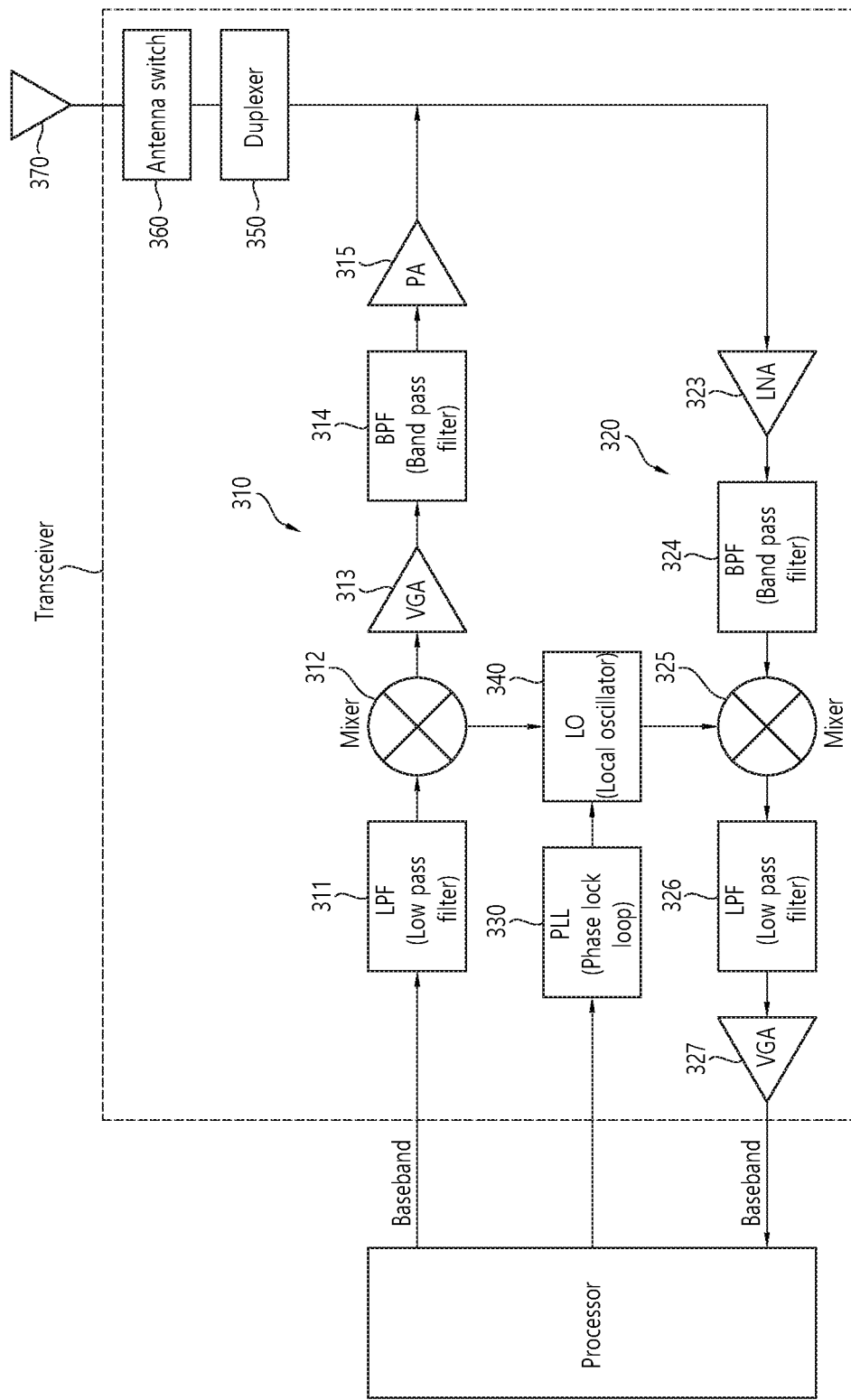
FIG. 18 illustrates an example of a transceiver of a wireless communication device according to an embodiment of the present disclosure.

FIG. 18 illustrates an example of a transceiver of a wireless communication device according to an embodiment of the present disclosure.

In particular, FIG. 18 illustrates an example of a transceiver that may be implemented in a frequency division duplex (FDD) system.

On the transmission path, like the processor described in FIGS. 14 and 15, at least one processor may process data to be suitable for transmission and forward a signal such as an analog output signal to the transmitter 310.

According to the example above, in the transmitter 310, an analog output signal is filtered by the low-pass filter (LPF) 311, for example, to remove noise due to digital-to-analog conversion (ADC) in the previous stage, up-converted from a baseband frequency to an RF frequency by an up-converter (for example, the mixer) 312, and amplified by an amplifier such as the variable gain amplifier (VGA) 313. The amplified signal is filtered by the filter 314, amplified by the power amplifier (PA) 315, routed through duplexer(s) 350/antenna switch(es) 360 and transmitted through the antenna 370.

On the reception path, the antenna 370 receives a signal in a radio environment, and received signals are routed by the antenna switch(es) 360/duplexer(s) 350 and forwarded to the receiver 320.

In the example above, a signal received by the receiver 320 is amplified by an amplifier such as the low noise amplifier (LNA) 323, filtered by the bandpass filter 324, and down-converted from the RF frequency to the baseband frequency by the down-converter (for example, mixer) 325.

The down-converted signal is filtered by the lowpass filter (LPF) 326, amplified by an amplifier such as the VGA 327 to obtain an analog input signal, where the analog input signal is provided to one or more processors such as the processors of FIGS. 14 and 15.

Furthermore, the local oscillator (LO) 340 generates LO signals for transmission and reception and provides the LO signals to the up-converter 312 and the down-converter 325, respectively.

In some implementation, the phase-locked loop (PLL) 330 may receive control information from the processor and send control signals to the LO generator 340 to generate LO signals for transmission and reception at appropriate frequencies.

The implements are not limited to the specific arrangement as shown in FIG. 18, and various constituting elements and circuits may be arranged differently from the example of FIG. 18.

Figure 19:
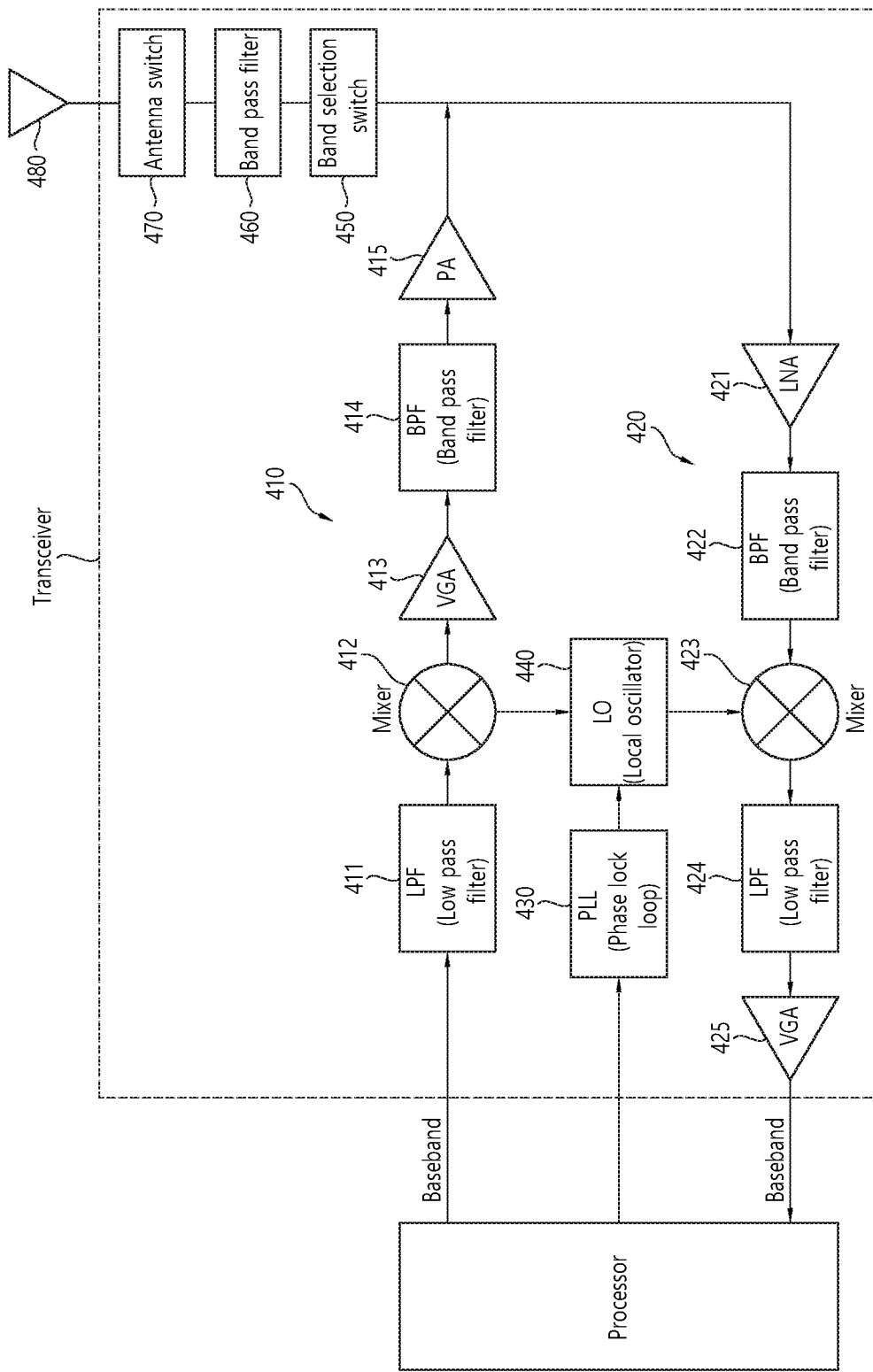
FIG. 19 illustrates another example of a transceiver of a wireless communication device according to an embodiment of the present disclosure.

FIG. 19 illustrates another example of a transceiver of a wireless communication device according to an embodiment of the present disclosure.

In particular, FIG. 19 illustrates an example of a transceiver that may be implemented in a time division duplex (TDD) system.

According to the implementation, the transmitter 410 and the receiver 420 of the transceiver of the TDD system may have one or more properties similar to the transmitter and the receiver of the transceiver of the FDD system.

In what follows, the structure of the transceiver of the TDD system will be described.

On the transmission path, a signal amplified by the power amplifier (PA) 415 of the transmitter is routed through the band selection switch 450, bandpass filter (BPF) 460, and antenna switch(es) 470, and forwarded to the antenna.

On the reception path, the antenna 480 receives signals in a radio environment, where the received signals are routed through the antenna switch(es) 470, bandpass filter (BPF) 460, and band selection switch 450 to be provided to the receiver 420.

Figure 20:
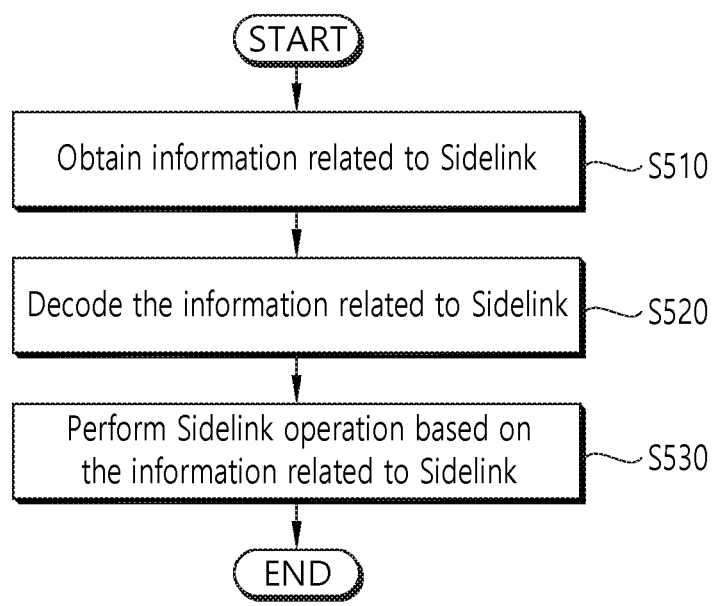
FIG. 20 illustrates operations of a wireless device related to wireless communication.

FIG. 20 illustrates operations of a wireless device related to wireless communication.

The wireless device operations related to wireless communication described in FIG. 20 are only an example, and wireless communication operations using various techniques may be performed in the wireless device. For wireless communication, various forms of information may be delivered.

In the example above, the wireless device obtains information related to wireless communication S510. Information related to wireless communication may be one or more resource configurations. Information related to wireless communication may be obtained from another wireless device or from a network node.

After obtaining information, the wireless device decodes information related to wireless communication S520.

After decoding information related to wireless communication, the wireless device performs one or more wireless communication operations based on the information related to wireless communication S530. Here, the wireless communication operation(s) performed by the wireless device may correspond to one or more operations described herein.

Figure 21:
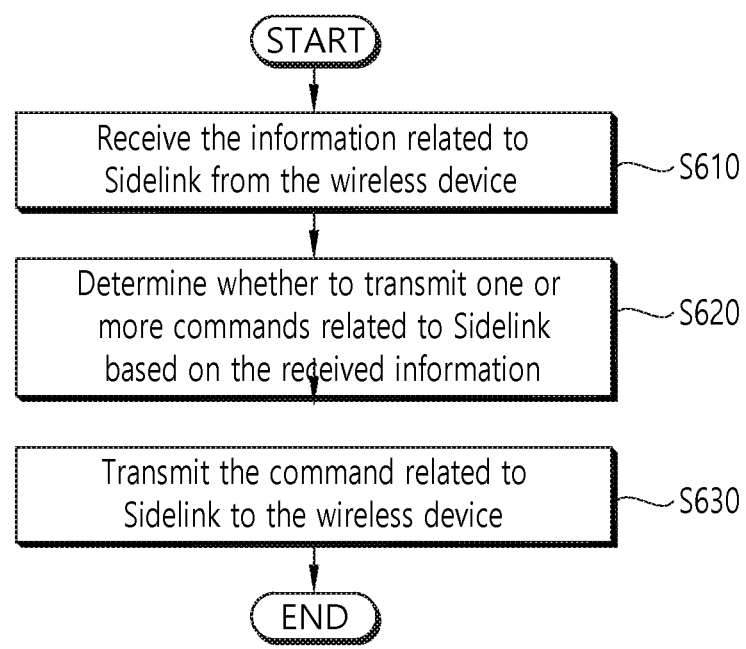
FIG. 21 illustrates an example of a network node operation related to wireless communication.

FIG. 21 illustrates an example of a network node operation related to wireless communication.

The network node operations related to wireless communication described in FIG. 21 are only an example, and wireless communication operations using various techniques may be performed in the network node.

The network node receives information on wireless communication from the wireless device S610. For example, information related to wireless communication may indicate information used to inform the network node of wireless communication information.

After receiving the information, the network node determines, based on the received information, whether to transmit one or more commands related to wireless communication S620.

According to the decision of the network node to transmit a command, the network node transmits a command(s) related to wireless communication to the wireless device S630. Depending on the implementation, after receiving a command transmitted by the network node, the wireless device may perform one or more wireless communication operation(s) based on the received command.

Figure 22:
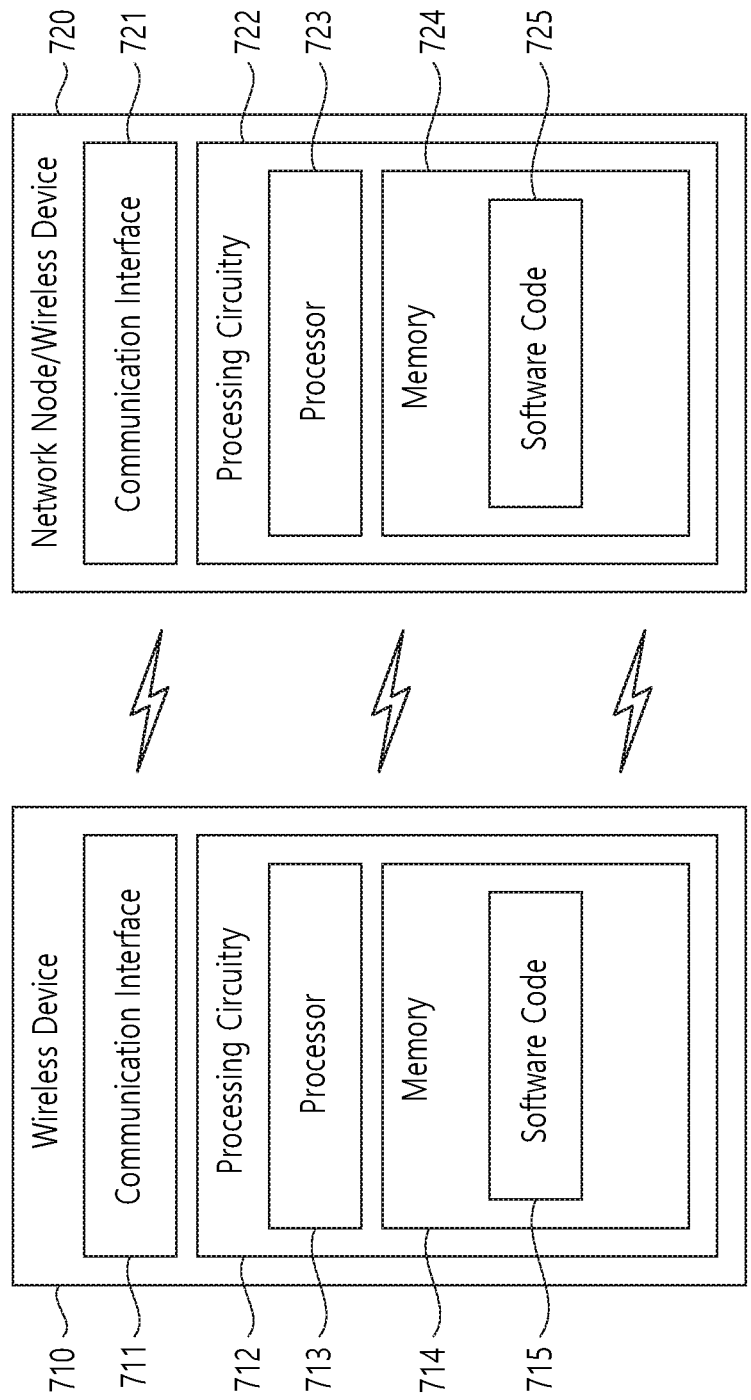
FIG. 22 is a block diagram illustrating an example of communication between a wireless device 710 and a network node 720.

FIG. 22 is a block diagram illustrating an example of communication between a wireless device 710 and a network node 720.

The network node 720 may be replaced with the wireless device or the UE of FIG. 22.

In the example above, the wireless device 710 includes one or more different wireless devices, network nodes and/or a communication interface 711 for communicating with other elements within a network. The communication interface 711 may include one or more transmitters, one or more receivers and/or one or more communication interfaces. The wireless device 710 includes a processing circuit 712. The processing circuit 712 may include one or more processors such as the processor 713 and one or more memories such as the memory 714.

The processing circuit 712 may be configured to control arbitrary methods and/or processes disclosed in the present disclosure and/or, for example, to allow the wireless device 710 to perform the methods and/or processes. The processor 713 corresponds to one or more processors for performing wireless device functions disclosed in the present disclosure. The wireless device 710 includes a memory 714 configured to store data, program software code and/or other information disclosed in the present disclosure.

In one or more implementations, when one or more processors such as the processor 713 are executed, the memory 714 is configured to store software code 715 including commands that instruct the processor 713 to perform the whole or part of the process descried in detail with respect to the implementation example of FIG. 22 and the present disclosure.

For example, one or more processors such as the processor 713 controlling one or more transceivers such as the transceiver 123 of FIG. 16 to transmit and receive information may perform one or more processes related to transmission and reception of information.

The network node 720 includes one or more different network nodes, wireless devices and/or a communication interface 721 for communicating with other elements on the network. Here, the communication interface 721 includes one or more transmitters, one or more receivers and/or one or more communication interfaces. The network node 720 includes a processing circuit 722. Here, the processing circuit includes a processor 723 and a memory 724.

In many implementations, when one or more processors such as the processor 723 are executed, the memory 724 is configured to store software code 725 including commands that instruct the processor 723 to perform the whole or part of the process descried in detail with respect to the implementation example of FIG. 22 and the present disclosure.

For example, one or more processors such as the processor 723 controlling one or more transceivers such as the transceiver 113 of FIG. 16 to transmit and receive information may perform one or more processes related to transmission and reception of information.

What is claimed is:

1. A method for performing a vehicle-to-X (V2X) transmission in a wireless communication system, the method performed by a user equipment (UE), which supports a carrier aggregations (CA) of a plurality of carriers, and comprising:

determining a first carrier used for a synchronization reference among the plurality of carriers; and performing the V2X transmission based on a determination;

wherein at least one carrier, which is not used as the synchronization reference, is a second carrier, and wherein the UE reduces a transmission power on the second carrier, or maintains a transmission of a packet on the second carrier, or drops the packet on the second carrier.

2. The method of claim 1, wherein a channel busy ratio (CBR) is used as a criterium for reducing the transmission power or dropping the packet on the second carrier among the plurality of carriers.

3. The method of claim 1, wherein a ProSe per packet priority (PPPP) is used as a criterium for reducing the transmission power or dropping the packet on the second carrier among the plurality of carriers.

4. The method of claim 1, wherein a carrier other than the second carrier among carriers not used as the synchronization reference is a third carrier, wherein the UE transmits a Side Link Synchronization Signal (SLSS) on the third carrier.

5. The method of claim 4, wherein the UE also transmits SLSS on the second carrier.

6. The method of claim 4, wherein a channel busy ratio (CBR) or a ProSe per packet priority (PPPP) is used as a criterium for reducing a transmission power or dropping a packet on the third carrier among the plurality of carriers.

7. The method of claim 1, wherein the UE reduces the transmission power or drops the packet on the second carrier based on a transmission power of a Side Link Synchronization Signal (SLSS) transmitted by another UE.

8. The method of claim 1, wherein the UE reduces the transmission power or drops the packet on the second carrier based on a field value of a priority in a Side Link Synchronization Signal (SLSS) transmitted by another UE.

9. The method of claim 8, wherein, if the field value of the priority is higher than a specific threshold, the UE transmits a data together with the SLSS or only the data, and if the field value of the priority is lower than the specific threshold, the UE reduces the transmission power on the second carrier or drops the packet.

10. A user equipment (UE) supporting a carrier aggregations (CA) of a plurality of carriers, and comprising:

a transceiver for transmitting and receiving a wireless signal; and a processor that operates in conjunction with the transceiver, wherein the processor is configured to:

determine a first carrier used for a synchronization reference among the plurality of carriers; and perform a vehicle-to-X (V2X) transmission based on a determination, wherein at least one carrier, which is not used as the synchronization reference, is a second carrier, and wherein the UE reduces a transmission power on the second carrier, or maintains a transmission of a packet on the second carrier, or drops the packet on the second carrier.

* * * * *